United States Patent
Izuno et al.

(10) Patent No.: US 10,328,343 B2
(45) Date of Patent: Jun. 25, 2019

(54) INFORMATION PROCESSING APPARATUS, STORAGE MEDIUM AND GAME CONTROL METHOD

(71) Applicant: NINTENDO CO., LTD., Kyoto (JP)

(72) Inventors: Toshiharu Izuno, Kyoto (JP); Shinya Saito, Kyoto (JP); Naohiro Hayashi, Tokyo (JP); Kenji Fujioka, Tokyo (JP); Katsutoshi Sato, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/665,602

(22) Filed: Aug. 1, 2017

(65) Prior Publication Data

US 2018/0036634 A1    Feb. 8, 2018

(30) Foreign Application Priority Data

Aug. 8, 2016   (JP) ................................ 2016-155607

(51) Int. Cl.
| | |
|---|---|
| *G06F 3/01* | (2006.01) |
| *A63F 13/23* | (2014.01) |
| *A63F 13/426* | (2014.01) |
| *A63F 13/428* | (2014.01) |
| *A63F 13/812* | (2014.01) |
| *G06F 3/0482* | (2013.01) |

(52) U.S. Cl.
CPC ............ *A63F 13/23* (2014.09); *A63F 13/426* (2014.09); *A63F 13/428* (2014.09); *A63F 13/812* (2014.09); *G06F 3/011* (2013.01); *G06F 3/0482* (2013.01)

(58) Field of Classification Search
CPC ...... A63F 13/23; A63F 13/426; A63F 13/428; A63F 13/812; G06F 3/011; G06F 3/0482
See application file for complete search history.

(56) References Cited

U.S. PATENT DOCUMENTS

| | | | |
|---|---|---|---|
| 2004/0180709 A1* | 9/2004 | Takahashi | A63F 13/10 463/3 |
| 2007/0197284 A1* | 8/2007 | Fujioka | A63F 13/10 463/30 |
| 2010/0178988 A1* | 7/2010 | Izuno | A63F 13/06 463/43 |
| 2013/0143653 A1* | 6/2013 | Yamaoka | A63F 13/10 463/31 |
| 2016/0300425 A1* | 10/2016 | Devaraj | G07F 17/3204 |

FOREIGN PATENT DOCUMENTS

JP       2016-55096       4/2016

\* cited by examiner

*Primary Examiner* — William H McCulloch, Jr.
*Assistant Examiner* — Yingchuan Zhang
(74) *Attorney, Agent, or Firm* — Nixon & Vanderhye PC

(57) ABSTRACT

A game apparatus being a non-limiting example information processing apparatus includes a display, and a game screen of a baseball game is displayed on the display. In a defensive (fielding team) side, in the game screen, a batter object and a catcher object are displayed, and an index object is displayed in front of the catcher object. Using the index object, a player designates a target position of a position that a ball object is to be thrown (pitching course) and a pitch type of the ball object, and instructs pitching. Even if the player designates the target position and the pitch type in any order, the target position and the pitch type can be set according to a designated order.

16 Claims, 14 Drawing Sheets

INDEX OBJECT (OMITTING DETERMINATION AREA)

PITCH TYPE (PITCH REPERTOIRE)

| TYPE | 122a | 122b | 122c | 122d | 122e | 122f |
|---|---|---|---|---|---|---|
| RIGHTY | FAST BALL | SCREWBALL | SINKER | FORK-BALL | CURVEBALL | SLIDER |
| LEFTY | FAST BALL | SLIDER | CURVEBALL | FORK-BALL | SINKER | SCREWBALL |

DETERMINATION AREA (FAST BALL)

SMALL       MEDIUM       LARGE

DETERMINATION AREA (BRAKING BALL)

SMALL       MEDIUM       LARGE

FAST BALL

SINKER (RIGHTY)

INDEX OBJECT
INCLUDING TRIANGLE
RING OBJECT (OMITTING
DETERMINATION AREA)

INDEX OBJECT INCLUDING
RECTANGLE RING OBJECT
(OMITTING DETERMINATION
AREA)

INDEX OBJECT WITH TYPE
OF PITCH OBJECT SHIFTED
OUTWARD (OMITTING
DETERMINATION AREA)

INDEX WITH SEPARATED DETERMINATION
AREA AND RELEASE OBJECT

LARGE DETERMINATION AREA

SMALL DETERMINATION AREA

TIMING AREA ARRANGED VERTICALLY

TIMING AREAS ARRANGED ABOVE AND BELOW

TIMING AREAS ARRANGED LEFT AND RIGHT

INDEX OBJECT (OMITTING
DETERMINATION AREA AND RELEASE
OBJECT)

THROWING TYPE (THROWING REPERTOIRE)

| TYPE | 422a | 422b | 422c | 422d | 422e |
|---|---|---|---|---|---|
| RIGHTY | LARGE BACKUP BALL | SMALL BACKUP BALL | FAST BALL BALL | SMALL HOOK BALL | LARGE HOOK BALL |
| LEFTY | LARGE HOOK BALL | SMALL HOOK BALL | FAST BALL BALL | SMALL BACKUP BALL | LARGE BACKUP BALL |

INFORMATION PROCESSING APPARATUS, STORAGE MEDIUM AND GAME CONTROL METHOD

CROSS REFERENCE OF RELATED APPLICATION

The disclosure of the patent application No. 2016-155607 filed on Aug. 8, 2016 is incorporated by reference.

FIELD

This application describes an information processing apparatus, storage medium and game control method, moving an object in a virtual space.

SUMMARY

It is a primary object of an embodiment(s) to provide a novel information processing apparatus, storage medium and game control method.

It is another object of this embodiment(s) to provide an information processing apparatus, storage medium and game control method, capable of improving operability by a player.

A first embodiment is an information processing apparatus that releases an object in a virtual space based on an instruction of a player and makes it move based on a trajectory of a type designated by the player, comprising a setting portion and a movement processing portion. The setting portion is configured to set, within a predetermined time period before the object is released, a reference position that is used for determining an arrival position of the object and a trajectory type of the object, in a designated order even if the player designates the reference position and the trajectory type in any order. Specifically, the player designates, using an input device, the reference position and the trajectory type irrespective of the designation order, and the information processing apparatus is configured to receive an operation input of the player, thereby to set the reference position and the trajectory type according to the designated order. However, an order of designating the reference position and the trajectory type is not fixed, either one may be designated first. The movement processing portion is configured to perform movement processing of the object based on the reference position and the trajectory type that are set in the setting portion. For example, a manner that the object is moved is displayed on a display that is provided on or connected to the information processing apparatus.

According to the first embodiment, since the reference position and the trajectory type can be designated irrespective of a designated order, it is possible to improve the operability by the player.

A second embodiment is the information processing apparatus according to the first embodiment, wherein the setting portion is configured to set again, within the predetermined time period before the object is released, the reference position and the trajectory type according to a changing order even if the player changes designation in any order.

According to the second embodiment, if within the predetermined time period, designation of the reference position or/and the trajectory type can be freely changed. A third embodiment is the information processing apparatus according to the first embodiment, further comprising a first processing portion. The first processing portion is configured to display, within a predetermined time period, together a first index that is variable according to a designated content of the reference position by the player and a second index that is variable according to a designated content of the trajectory type by the player. The first index and the second index are displayed on the above-described display.

According to the third embodiment, since the indexes are displayed, it is possible to easily designate the reference position and the trajectory type.

A fourth embodiment is the information processing apparatus according to the third embodiment, wherein the first processing portion is configured to display the second index in a position near the first index. For example, the first index and the second index are displayed side by side. Moreover, for example, the second index is displayed around the first index.

According to the fourth embodiment, since the second index is displayed in the position near the first index, it is possible to visually confirm both the first index and the second index without moving a line of sight, or by moving only a line of sight without moving a head, for example. Therefore, it is easy to operate it.

A fifth embodiment is the information processing apparatus according to the third embodiment, wherein the first processing portion is configured to display the second index with changing a position thereof on a route surrounding the first index according to the designation content of the trajectory type by the player.

According to the fifth embodiment, it is possible to know the trajectory type in accordance with the position of the second index on the route surrounding the first index.

A sixth embodiment is the information processing apparatus according to the third embodiment, wherein the first processing portion is configured to move the second index in conjunction with a movement of the first index according to the designation content of the reference position by the player.

According to the sixth embodiment, since the second index is moved in conjunction with the first index, it is possible to designate the trajectory type based on the second index while moving the first index, for example.

A seventh embodiment is the information processing apparatus according to the first embodiment, further comprising a second processing portion. The second processing portion is configured to display a third index for setting a difference between the reference position and an actual arrival position of the object. For example, according to an operation input of the player based on the third index, the difference of the reference position (in relation to arrival position) of the object designated according to the first index and the actual arrival position of the object is set. Therefore, in order to move the object to the designated reference position of the object, it is necessary to perform an operation input accuracy.

According to the seventh embodiment, since the actual arrival position of the object is changed according to accuracy of the operation input of the player based on the third index, it is possible to obtain an enjoyment of operation.

An eighth embodiment is the information processing apparatus according to the seventh embodiment, wherein the second processing portion is configured to display the third index that is at least a part thereof is common to the second index.

According to the eighth embodiment, since at least a part of the third index is common to the second index, it is possible to prevent the number of indexes from increasing unnecessarily. Moreover, since a plurality of indexes are not dispersed, it is possible to prevent the player from having difficulty in visually recognizing.

A ninth embodiment is the information processing apparatus according to the seventh embodiment, wherein the second processing portion is configured to display the third index including a timing object that moves along a predetermined route and a determination object that is arranged on the route. The setting portion is configured to set a difference based on a positional relationship between the timing object and the determination object, the positional relationship being specified by the player. For example, a position of the timing object on the route can be specified according to an operation input of the player based on the third index. The difference of the reference position and the arrival position is set according to a deviation amount of a position of the specified timing object and a position of the determination object arranged on the route.

According to the ninth embodiment, it is possible to obtain an enjoyment of operation like the seventh embodiment.

A tenth embodiment is the information processing apparatus according to the ninth embodiment, wherein the predetermined route surrounds the first index. Therefore, the third index is displayed on a circumference of the first index.

According to the tenth embodiment, it is possible to seek a timing for an operation input based on the third index while performing an operation input based on the first index and the second index. For example, since the second index and the third index are arranged on the circumference of the first index if the player gazes at the first index, the player does not need to frequently change a direction of a line of sight or/and a direction of a head. That is, it is easy to operate it.

An eleventh embodiment is the information processing apparatus according to the ninth embodiment, wherein the determination object constituting the third index is at least partly in common to the second index. Specifically, the trajectory type is designated according to a position of the determination object, and a difference between the reference position and the actual arrival position is set according to a positional relationship of the timing object and the determination object.

According to the eleventh embodiment, like the eighth embodiment, it is also possible to prevent the number of indexes from increasing unnecessarily, and to prevent the player from having difficulty in visually recognizing.

A twelfth embodiment is the information processing apparatus according to the first embodiment, further comprising a third processing portion. The third processing portion is configured to display a fourth index enable the player to recognize a predetermined time period that the player can perform designation.

According to the twelfth embodiment, it is possible to know the predetermined time period that the player can perform an operation input based on the first index and the second index by viewing the fourth index.

A thirteenth embodiment is the information processing apparatus according to the twelfth embodiment, wherein the third processing portion is configured to display the fourth index in a position surrounding the first index.

According to the thirteenth embodiment, if the player gazes at the first index, the fourth index is arranged at its circumference, and therefore, it is possible to know the time limit without frequently changing a direction of a line of sight or/and a direction of a head. Therefore, it is easy to operate it.

A fourteenth embodiment is the information processing apparatus according to the first embodiment, further comprising a fourth processing portion. The fourth processing portion is configured to display a fifth index enable the player to recognize the trajectory type capable of being designated by the player.

According to the fourteenth embodiment, since the trajectory type capable of being designated can be recognized, it is possible to easily designate the trajectory type.

A fifteenth embodiment is a non-transitory computer readable storage medium storing a game program that is executed by one or more processors of an information processing apparatus that performs control of an object that is released in a virtual space based on an instruction of a player and moved based on a trajectory of a type designated by the player, wherein the game program causes the one or more processors to perform: a setting, within a predetermined time period before the object is released, a reference position that is used for determining an arrival position of the object and a trajectory type of the object, in a designated order even if the player designates the reference position and the trajectory type in any order; and performing movement processing of the object based on the reference position and the trajectory type that are set in the setting.

A sixteenth embodiment is a game control method of an information processing apparatus that performs control of an object that is released in a virtual space based on an instruction of a player and moved based on a trajectory of a type designated by the player, comprising steps of: (a) setting, within a predetermined time period before the object is released, a reference position that is used for determining an arrival position of the object and a trajectory type of the object, in a designated order even if the player designates the reference position and the trajectory type in any order; and (b) performing movement processing of the object based on the reference position and the trajectory type that are set in the step (a).

In also the fifteenth and sixteenth embodiments, as in the first embodiment, it is possible to improve the operability by a player.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
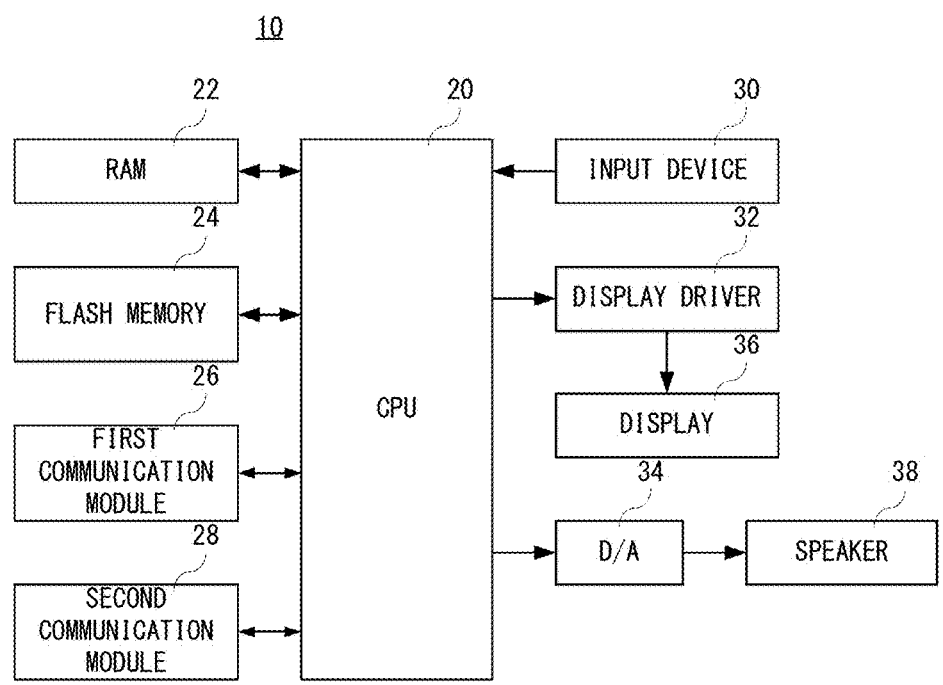
FIG. 1 is a block diagram showing a non-limiting example electric structure of a game apparatus.

With referring to FIG. 1, a non-limiting example game apparatus 10 includes a CPU 20, and a RAM 22, a flash memory 24, a first communication module 26, a second communication module 28, an input device 30, a display driver 32 and a D/A converter 34 are connected to the CPU 20. Moreover, a display 36 is connected to the display driver 32, and a speaker 38 is connected to the D/A converter 34.

For example, the game apparatus 10 of this embodiment is a portable information processing apparatus, but it is not necessary to be limited to a game dedicated machine, and may be a mobile terminal having a game function. A typical example of the mobile terminal having a game function is a feature phone or a smart phone.

The CPU 20 is in charge of overall control of the game apparatus 12. The RAM 22 is a nonvolatile storage medium, and is used as a working memory and a buffer memory for the CPU 20. The flash memory 24 is a nonvolatile storage medium, and is used in order to store an application program such as a game application and to store (save) various kinds of data.

However, there is no necessity that an application is limited to a game application, various kinds of application such as a document production application, an email application, a painting application, character or letter practice application, a linguistic training application, a learning application, etc. correspond.

The first communication module 26 has a function to access a wireless LAN according to the standard of IEEE802.11.b/g, for example. Therefore, the CPU 20 transmits or receives data to or from other equipment (computers, other game apparatuses 10, etc.) via an access point and Internet (network) with using the first communication module 26, for example. However, it is also possible to transmit or receive data to or from other equipment directly with using the first communication module 26.

The second communication module 28 has a function to perform short-distance wireless communication. Specifically, the second communication module 28 has a function to transmit or receive an infrared signal to or from other equipment (other game apparatuses etc.) with a predetermined communication system (infrared system, for example), and a function to perform wireless communication between the same or similar kind of game apparatus according to a predetermined communication protocol (multilink protocol, for example). Therefore, the CPU 20 can transmit or receive data to or from the same or similar kind of other game apparatuses directly with using the second communication module 28, for example. However, instead of the short-distance wireless communication of an infrared system, short-distance wireless communication according to other wireless-communication standards such as Bluetooth (registered trademark) may be performed.

The input devices 30 are various kinds of push buttons or switches that are provided on the game apparatus 10, for example, and are used by the user for various kinds of operations such as menu selection and a game operation. However, as the input device 30, instead of the push buttons or switches, or together with the push buttons or switches, input portion such as a pointing devices (a touch panel etc., for example), a microphone, a camera, etc. may be provided. Furthermore, the touch panel may be built into a display 36 described later. The display 36 in this case is a touch panel integral type display.

The display driver 32 is used in order to display various kinds of images such as a game image on the display 36 under instructions of the CPU 20. Although illustration is omitted, the display driver 32 contains a video RAM (VRAM).

The D/A converter 34 converts sound data applied from the CPU 20 into an analog game sound, and outputs the same to the speaker 38. In addition, the game sound means is a sound signal corresponding to a sound required for the game, such as an imitation sound of a game character or object, sound effect and music (BGM).

In addition, the electric structure of the game apparatus 10 shown in FIG. 1 is a mere example, and it does not need to be limited to this. For example, the first communication module 26 or/and the second communication module 28 can be omitted.

Figure 2:
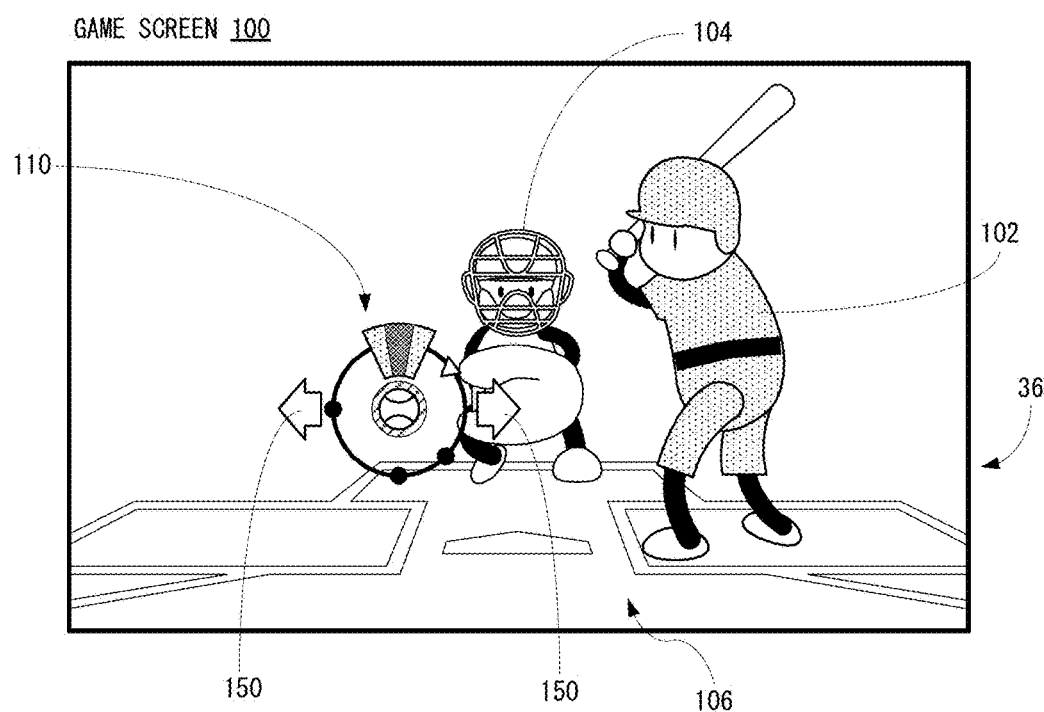
FIG. 2 is an illustration view showing a non-limiting example game screen of a baseball game displayed on a display of the game apparatus shown in FIG. 1.

FIG. 2 shows a non-limiting example game screen 100 displayed on the display 36 when making a pitcher object 160 (see FIG. 3) perform pitching in a baseball game that is played with the game apparatus 10 shown in FIG. 1. An object 102 imitating a batter (batter object) and an object 104 imitating a catcher (catcher object) are displayed in the game screen 100. Moreover, background objects 106 such as a ground, a batter box, catcher box, a home base and foul lines are also displayed in the game screen 100. However, in the game screen 100 shown in FIG. 2, an umpire object, a back net object, a spectator object, etc. that are located behind the catcher object 104 are omitted. This is also true for FIG. 3.

Moreover, an index object 110 is displayed in front (front side) of the catcher object 104, and operation guides 150 are displayed on a left and right of the index object 110.

The index 110 is an index for setting contents (information) concerning with pitching when making the pitcher object 160 perform pitching, for instructing pitching and for determining success or failure of the pitching. In this embodiment, the contents concerning with pitching include a pitching position (pitching course) of a ball object 162 (see FIG. 3) and a pitch type. However, an order of designating the pitching course and the pitch type is not fixedly decided, and therefore, a player can designate the pitching course and the pitch type regardless such an order. That is, even if the player designates the pitching course and the pitch type in any order, the pitching course and the pitch type can be set according to a designated order. Moreover, before pitching (until a pitching instruction is input), designation of at least one of the pitching course and the pitch type can be changed. When changing designation of both the pitching course and the pitch type, even if the player designates change of the pitching course and the pitch type in any order, the pitching course and the pitch type can be set again in accordance with a designated order of change.

The operation guides 150 are arrow mark objects indicative of a direction that the index object 110 can be moved, and are displayed on the left and right of the index object 110. In this embodiment, the index object 110 is movable leftward and rightward as indicated by the operation guides 150. However, the index object 110 may also be movable upward and downward.

In addition, the operation guides 150 do not need to be displayed. Alternatively, the operation guides 150 may be displayed until a predetermined time period (predetermined number of innings) elapses since a start of the baseball game.

If the player instructs pitching, the index object 110 is non-displayed from the game screen 100 and a virtual camera is zoomed out, and in the game screen 100, the pitcher object 160 is displayed in addition to the batter object 102 and the catcher object 104. Then, the pitcher object 160 starts pitching motion and pitches (releases) the ball object 162.

Figure 3:
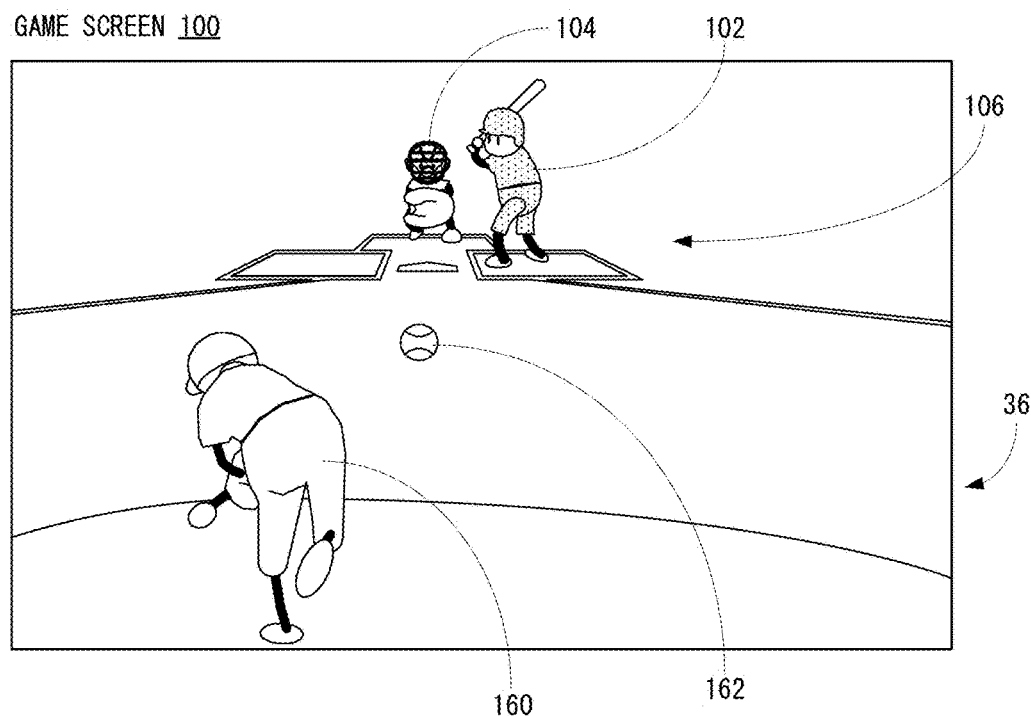
FIG. 3 is an illustration view showing another non-limiting example game screen of the baseball game displayed on the display of the game apparatus shown in FIG. 1.

FIG. 3 is another non-limiting example game screen 100 at a certain time point when the ball object 162 moves in the virtual space after the pitcher object 160 performs a pitching motion.

As shown in FIG. 3, if the pitcher object 160 pitches the ball object 162, as described later in detail, the ball object 162 moves in the virtual space according to a trajectory that is decided according to success or failure of pitching.

Figure 4:
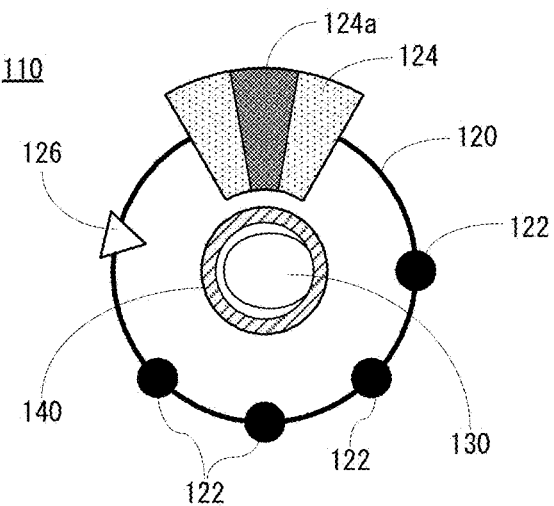
FIG. 4 is an illustration view showing a non-limiting example index object displayed in the game screen shown in FIG. 2.

FIG. 4 is an illustration view showing a non-limiting example index object 110 shown in FIG. 2. As shown in FIG. 4, the index object 110 includes a ring-like object (ring object) 120, and the ring object 120 is arranged on a position surrounding a position designation object 130 and a timer object 140 both described later.

On the ring object 120, one or more objects (pitch type objects) 122 indicating pitch types (pitch repertoire) that the pitcher object 160 can pitch are displayed in a visually recognizable (selectable) manner. The pitch type object 122 functions as an index capable of visually recognizing a pitch type that can be pitched. In this embodiment, the pitch type object 122 is arranged on the ring object 120 so as to surround the circumference of the position designation object 130 and the timer object 140 both described later.

Moreover, on the ring object 120, a determination area (determination object) 124 is displayed in a position corresponding to a pitch type that is designated (selected) to be pitched. The determination area 124 functions as an index capable of visually recognizing a pitch type that is being designated (selected). However, in this embodiment, if a pitch type is designated, a trajectory type (course) of the ball object 162 is decided (set). The determination area 124 exists on the ring object 120, and as described later, displayed in a position corresponding to a pitch type that is designated by the player, and thus, displayed on a position near (or adjacent to) the position designation object 130.

Furthermore, there is displayed an object (release object) 126 that moves on the ring object 120 so as to designate a timing that a movement of the ball object 162 is to be started. However, the timing that a movement of the ball object 162 is to be started means a timing that an action for pitching (pitching motion) of the ball object 162 is to be started. The release object 126 is moved on a predetermined route such as the ring object 120, and functions, along with the above-described determination area 124, as an index for seeking a timing that the player instructs a start of pitching motion.

Moreover, the index object 110 includes in its center the position designation object 130 that is used as an index for designating a target position of a pitching course. However, the target position of the pitching course is an target arrival position of the ball object 162, and is a reference position that is used for deciding an actual arrival position of the ball object 162.

Furthermore, around the position designation object 130, there is a ring-like object (timer object) 140 for notifying a predetermined time period (time limit) until the pitching motion or the movement of the ball object 162 is made to be started. The timer object 140 functions as an index capable of visually recognizing the time limit.

Thus, the index object 110 is constituted in a manner that collecting the ring object 120, one or more the pitch type objects 122, the determination area (determination object) 124, the release object 126, the position designation object 130 and the timer object 140 are collected into a single object. That is, the index object 110 is a single user graphical interface. Therefore, when designating a target position of the ball object 162 with using the position designation object 130, a whole of the index object 110 is moved. That is, in conjunction with a movement of the position designation object 130, the ring object 120, the pitch type object 122, the determination area (determination object) 124, the release object 126 and the timer object 140 are moved.

Moreover, the index object 110 of this embodiment is constituted with a size capable of fitting within an effective visual field of the player. However, a center of the effective visual field is set in a center of the index object 110 (or position designation object 130).

Here, the effective visual field means a range that a line of sight can be instantaneously moved and information can be received with high performance (horizontal (left/right): ±15 degrees (°), up: 8 degrees (°), down: 12 degrees (°)). However, in the portable game apparatus 10, when assuming that the player holds the portable game apparatus 10 with separating by a first predetermined distance (for example, 30 cm) from his/her own eye, a size (range) of the index object 110 is a size capable of fitting within an area or range corresponding to the effective visual field on a display surface of the display 36 or in the game screen 100 displayed on the display 36. Moreover, in the stationary game apparatus 10, when assuming that a television monitor (not shown) connected to the stationary game apparatus 10 is provided apart from the eye of the player by a second predetermined distance (for example, 2-5 m), a size (range) of the index object 110 is a size capable of fitting within an area or range corresponding to the effective visual field on a display surface of the television monitor or the game screen 100 displayed on the television monitor. Furthermore, as for an arcade game, similarly, an area or range on a screen corresponding to the effective visual field is decided based on a distance between the screen and the eye of the player, and the index object 110 is displayed in a size capable of fitting within the decided area or range.

Therefore, even if the player does not change a direction of his/her face (head), by only turns a line of sight to the index object 110, the player can perform designation of a pitching course, designation of a pitch type and pitching instruction.

In this embodiment, as described above, although the index object 110 is constituted in a size capable of fitting within the effective visual field, if in the portable game apparatus 10, even if not making a head move, by only moving a line of sight, a whole display surface of the display 36 can be seen. Therefore, it is possible to consider that it is sufficient that respective objects (120, 122, 124, 126, 130, 140) constituting the index object 110 are displayed together on the display surface (game screen 100) until the player instructs pitching after the player starts setting of the contents of pitching.

Figures 5A, 5B:
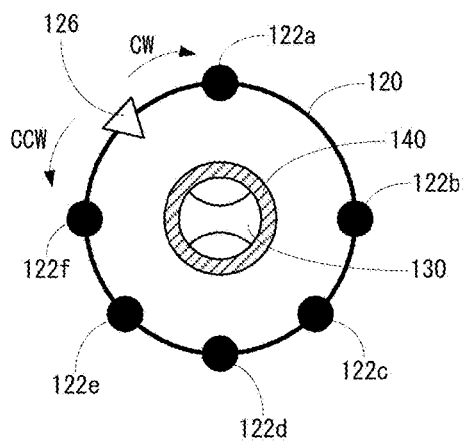
FIG. 5A is an illustration view showing a non-limiting example index object (omitting determination area)
FIG. 5B is an illustration view showing non-limiting example pitch types capable of being designated in the index object shown in FIG. 5A.

As shown in FIG. 5A, in the index object 110, the pitch type objects 122 (122a, 122b, 122c, 122d, 122e and 1220 up to six are displayed on the ring object 120. In this embodiment, although the pitch type object 122 is shown by a dot, this is a mere example and it may be indicated by other shape or figure.

As shown in FIG. 5B, in this embodiment, in case of a right-handed pitcher (righty pitcher), the pitch type object 122a indicates a fast ball, the pitch type object 122b indicates a screwball (shoot ball), the pitch type object 122c indicates a sinker, the pitch type object 122d indicates a fork ball, the pitch type object 122e indicates a curve, and the pitch type object 122f indicates a slider. On the other hand, in case of a left-handed pitcher (lefty pitcher), left-right reversed with a case of the right-handed pitcher, the pitch type object 122a indicates a fast ball, the pitch type object 122b indicates a slider, the pitch type object 122c indicates a curve, the pitch type object 122d indicates a fork ball, the pitch type object 122e indicates a sinker, and the pitch type object 122f indicates a screwball. Hereinafter, the same applies in this specification.

Thus, for each of the righty pitcher and the lefty pitcher, the pitch type objects 122b-122f are arranged on positions each corresponding to a direction that a breaking ball is curved on the ring object 120. Therefore, the player can designate a pitch type intuitively.

However, since the pitch type object 122 is displayed only about the pitch type (pitch repertoire) capable of being pitched by the pitcher object 160, when a pitcher object 160 capable of pitching only a fast ball is selected, only the pitch type object 122a is displayed on the ring object 120. As another embodiment, all pitcher objects may be configured to be able to pitch all pitch types. In such a case, irrespective of the pitcher object 160 to be used, as shown in FIG. 5, all the pitch type objects 122 (122a-122f) are displayed.

Although a detailed description is omitted, there are two or more pitcher objects 160, and one (1) pitcher object 160 is selected by the player.

At every time that the pitcher object 160 performs pitching, a pitch type is designated according to an operation of the player. For example, by using a direction input button (cross button) in the input device 30 provided on the game apparatus 10, it is possible to directly designate a desired one of the pitch type objects 122a-122f Moreover, by operating another button or key, it is also possible to designate the pitch type objects 122a-122f sequentially (clockwise rotation or counterclockwise rotation).

Although omitted in FIG. 5A, the determination area 124 is displayed so as to be overlapped with a designated (selected) one of the pitch type objects 122a-122f at every timing that the pitch type (pitch type objects 122a-122f) is designated. However, at the time of a pitching start, a fast ball is designated by default and the determination area 124 is displayed on a position overlapping the pitch type object 122a. It should be noted that the time of pitching start means the time that the ball object 162 of the first ball is pitched for each batter object 102 in each of innings. However, the time of pitching start may be the time that the ball object 162 of the first ball is pitched for the first batter object 102 in each of innings.

Moreover, although described in detail later, the determination area 124 is different between a pitch type of a fast ball and a pitch type other than that, and a size (range) is different among a pitch type that the pitcher object 160 is good at (good control), a pitch type that the pitcher object is poor at (poor control) and a pitch type that is not either of them (pitch type of ordinary control).

As described above, the release object 126 moves so as to go around on the ring object 120, but a moving direction is different between a case of the righty pitcher and a case of the lefty pitcher. In this embodiment, in case of the righty pitcher, the release object 126 moves counterclockwise (CCW) on the ring object 120. On the other hand, in case of the lefty pitcher, the release object 126 moves clockwise (CW) on the ring object 120.

The position designation object 130 designates a target pitching course, as described above. As described above, the target pitching course is a target position of the ball object 162. The player makes the index object 110 move to left and right, and designates the position designation object 130 (center thereof) located at the center of the index object 110 as the target position of the ball object 162.

The timer object 132 is gradually shortened in accordance with a count of the time limit from a position corresponding to 0 o'clock (12 o'clock), for example when the count of the time limit is started after it becomes a pitching enable state, and the timer object 132 is all non-displayed when the count of the time limit is ended. However, the pitching enable state is meant a state where the batter object 102 stands in the batter box and the pitcher object 160 grasps the ball object 162.

For example, before the pitcher object 160 pitches the ball object 162, if ending the count of the time limit, according to having ended the count of the time limit, an instruction of pitching is input automatically.

The player operates so as to input a release (pitching) instruction when the release object 126 overlaps with the determination area 124. When the pitching instruction is input at a position that the release object 126 overlaps with the determination area 124, it is determined as pitching success. On the other hand, when the pitching instruction is input at a position that the release object 126 does not overlap with the determination area 124, it is determined as pitching failure.

For example, if the player inputs the pitching instruction, the release object 126 is stopped in response to this. The success or failure of pitching is determined according to whether the position of this release object 126 is fit within the determination area 124, that is, based on a positional relationship between the determination area 124 and the release object 126.

When determined as pitching success, the ball object 162 moves so as to arrive at the designated target position on the trajectory according to the designated pitch type. Moreover, when determined as pitching success, a ball speed is the same as a speed according to the ability that the pitcher object 160 has. For example, as for the ball speed, corresponding to each pitcher object 160, a speed of fast ball (a first speed) and a speed of breaking ball (a second speed) are prepared. It should be noted that the first speed is faster than the second speed. Moreover, when a pitch type is a fast ball, if a nice pitching is determined, the first speed is further increased with a predetermined speed.

On the other hand, when determined as pitching failure, the ball object 162 is moved so that the actual arrival position of the ball object 162 is deviated from the designated target position according to a deviation amount between the determination area 124 and the release object 126. For example, if the deviation amount is less than a predetermined threshold value, according to the deviation amount, the arrival position of the ball object 162 is moved to left or right from the target position. That is, according to the deviation amount, a difference between the target position of the ball object 162 and the arrival position is set. Moreover, if the deviation amount is equal to or more than the predetermined threshold value, the ball object 162 is moved so that a wild pitch occurs or the ball object 162 is moved to the middest center. In this embodiment, if determined as pitching failure, even if the breaking ball is designated, the trajectory of the ball object 162 becomes a fast ball without being changed. Moreover, when determined as pitching failure, a movement speed (ball speed) of the ball object 162 is set, irrespective of the pitch type being set, as a speed (second speed) of a case of the breaking ball according to the ability that the pitcher object 160 has.

Thus, based on the positional relationship of the determination area 124 and the release object 126, the actual arrival position of the ball object 162 and the movement speed of the ball object 162 are set. That is, it is possible to say that based on the positional relationship between the determination area 124 and the release object 126, the difference of the target position of the ball object 162 and the actual arrival position thereof is set, and the difference between the ball speed according to the designated pitch type and actual ball speed is set. However, the actual arrival position (difference of the target position and the actual arrival position) of the ball object 162 or the movement speed (difference of the ball speed according to the designated pitch type and the actual ball speed) of the ball object 162 may be set.

For example, the deviation amount is a distance between the determination area 124 and the release object 126 on the circumference or straight line thereof. However, the deviation amount may be a central angle theta ($\theta$) with a center point of the ring object 120 or a straight line distance $\sin \theta$ using the central angle theta ($\theta$). Moreover, the predetermined threshold value is a value having been set by a developer etc. and is experientially obtained by a simulation.

As described above, in this embodiment, the determination area 124 functions as an index in designating a pitch type. Moreover, the determination area 124 also functions as a part of index seeking a timing that a pitching instruction is to be input based on the positional relationship with the release object 126. That is, the determination area 124 is used in common as two different indexes.

In addition, although a size of the determination area 124 is made to be changed in this embodiment, a determination area 124 having a size of one kind is prepared, and a movement speed of the release object 126 may be changed according to a pitch type. Even if it does in this way, it is possible to express a pitch type that the pitcher object is good at (good control), a pitch type that the pitcher object is poor at (poor control) and an ordinary pitch type.

Moreover, as a stamina value of the pitcher object 160 is decreased, a size of the determination area 124 may be reduced or/and a movement speed of the release object 126 may be increased. In this way, it can be expressed that the accuracy of control decreases as the pitcher object 160 becomes tired.

Figure 6A:
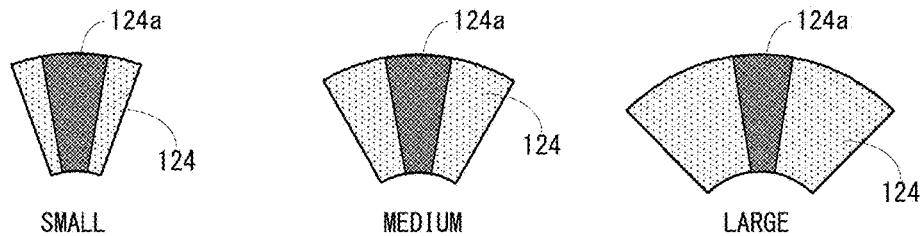
FIG. 6A is an illustration view showing a non-limiting example determination area to be set when the pitch type is a fast ball.
Figure 6B:
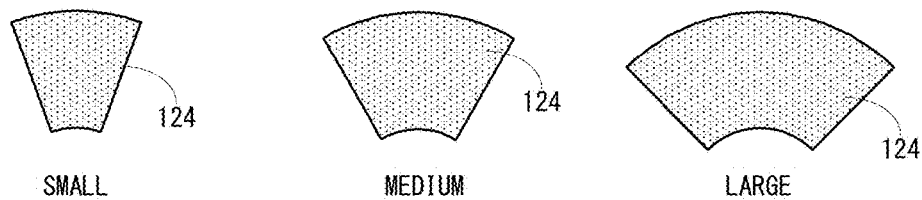
FIG. 6B is an illustration view showing a non-limiting example determination area to be set when the pitch type is other than the fast ball.

FIG. 6A is an illustration view showing a non-limiting example determination area 124 when a pitch type is a fast ball, and FIG. 6B is an illustration view showing a non-limiting example determination area 124 when a pitch type is a pitch type other than a fast ball (breaking ball).

As shown in FIGS. 6A and 6B, the determination area 124 is prepared in the plural number of kinds (three kinds in this embodiment). The sizes of the determination areas 124 differ in this embodiment. More specifically, a width (length in a direction of a circumference of the ring object 120) of the determination area 124 differs. A reason why three kinds of determination areas 124 having different sizes are thus used is for setting, for each pitcher object 160, a pitch type that the pitcher object 160 is good at, a pitch type that the pitcher object is poor at or a pitch type that is not either of them (ordinary).

In this embodiment, a large determination area 124 is set in case of a good pitch type, a small determination area 124 is set in case of a poor pitch type, and a medium size determination area 124 is set in case of an ordinary pitch type. Therefore, the determination area 124 is changed in position to be displayed according to the designated pitch type, and the determination area 124 is changed in size to be displayed according to a good pitch type, a poor pitch type or an ordinary pitch type. That is, the determination area 124 is an index that is variable according to the pitch type designated by the player.

Therefore, since the determination area 124 is large if it is a good pitch type, a possibility that the release object 126 is stopped at a position overlapping with the determination area 124 is made high degree. That is, it can be said that the control is good. On the other hand, since the determination area 124 is small if it is a poor pitch type, a possibility that the release object 126 is stopped at a position overlapping with the determination area 124 is made low degree. That is, it can be said that the control is poor. Since a size of the determination area 124 is middle if it is an ordinary pitch type, a possibility that the release object 126 is stopped at a position overlapping with the determination area 124 is made middle degree. That is, the control is ordinary. Thus, the difficulty for each pitch type is set with the size of the determination area 124. Therefore, by seeing the size of the determination area 124, it is possible for the player to easily determine whether the designated pitch type is a good pitch type, a poor pitch type or an ordinary pitch type for the pitcher object that is being used.

Moreover, as shown in FIG. 6A, when the pitch type is a fast ball, an area 124a (hereinafter, called "partial area") for determining whether it is nice pitching is set in a part (center) of an inside the determination region 124. As also shown in FIG. 6A, a size of the partial area 124a is fixed and is not changed according to the size of the determination area 124. However, a size of the partial area 124a may be changed in proportion to or in inverse proportion to the size of the determination area 124.

In addition, in this embodiment, only when a pitch type is a fast ball, the partial area 124a is set in the determination area 124, but the partial area 124a may be set for all the pitch types, or for only good pitch type or only a poor pitch type. Alternatively, a partial region 124a may not be set for all the ball types.

Figure 6C:
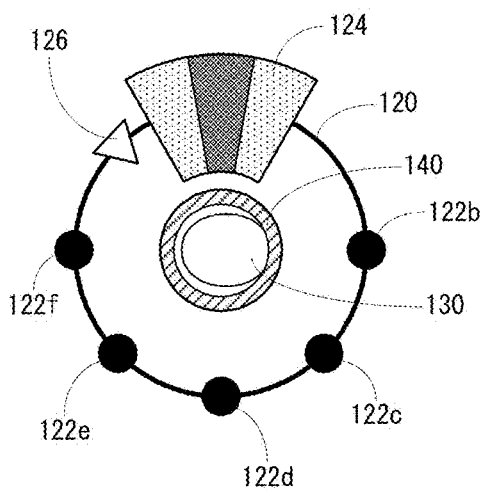
FIG. 6C is an illustration view showing a non-limiting example index object displayed in the game screen when the pitch type is a fast ball.
Figure 6D:
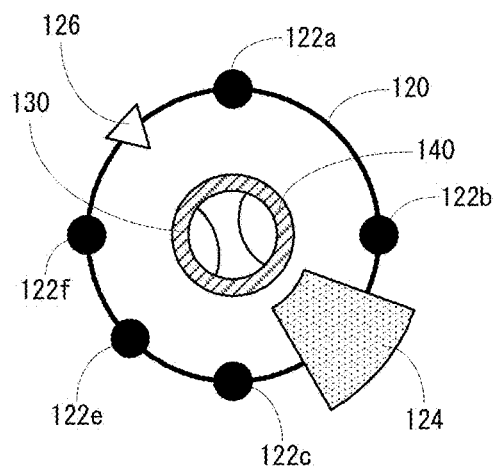
FIG. 6D is an illustration view showing a non-limiting example index object displayed in the game screen when the pitch type is a sinker.

FIG. 6C is an illustration view showing a non-limiting example index object 110 when a pitch type is a fast ball, and FIG. 6D is an illustration view showing a non-limiting example index object 110 when a pitch type is a sinker (righty pitcher).

As shown in FIG. 6C, when the designated pitch type is a fast ball, the determination area 124 is set (displayed) on (in front of) the pitch type object 122a indicative of a fast ball. In the example shown in FIG. 6C, since the determination area 124 of a medium size is displayed, it can be seen that a fast ball is an ordinary pitch type (ordinary control) for the pitcher object 160 in use.

Moreover, as shown in FIG. 6D, when the designated pitch type is a sinker, the determination area 124 is set (displayed) on (in front of) the pitch type object 122c indicative of a sinker. In the example shown in FIG. 6D, since the determination area 124 of a small size is displayed, it can be seen that a sinker is a poor pitch type (poor control) for the pitcher object 160 in use.

Furthermore, in this embodiment, the display of the position designation object 130 is changed according to a pitch type. A figure of ball is applied to the position designation object 130, and the figure is changed according to a pitch type. In this embodiment, a figure representing a pattern of a ball stitching according to how the ball is grasped at the time that the pitcher actually pitches the designated pitch type is displayed. However, how to grasp the ball when pitching each pitch type is a generally known grasping method.

Since the position designation object 130 is thus displayed with the figure of ball according to a pitch type, it is also possible to know the designated pitch type from the figure of ball of this position designation object 130.

In addition, the index object 110 shown in this embodiment is an example, and it should not be limited. Further non-limiting example index objects 110 are shown in FIG. 7-FIG. 9. However, the index object 110 of each of the further examples is also formed with a size capable of fitting within an effective visual field.

Figure 7A:
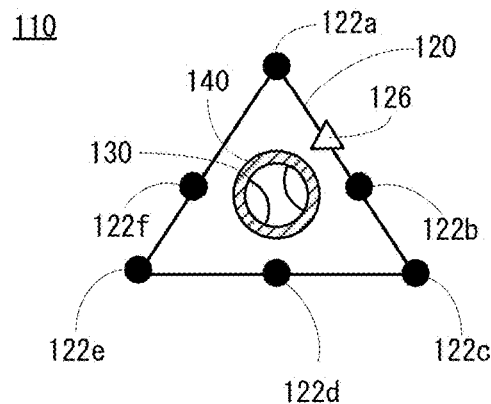
FIG. 7A is an illustration view showing a non-limiting second example index object.
Figure 7B:
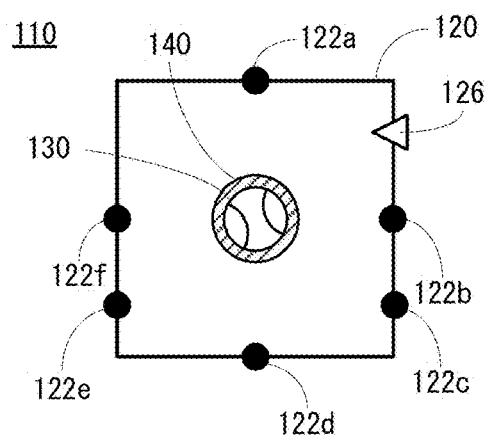
FIG. 7B is an illustration view showing a non-limiting third example index object.

For example, although the ring object 120 is in a shape of a circle that is an example of a closed curve line, it may be an ellipse. Moreover, a shape of the ring object 120 does not need to be limited to a closed curve line, and as shown in FIGS. 7A and 7B, it may be a polygon such as a triangle, a quadrangle, etc. Hereinafter, the closed curve line figure and the polygon are collectively referred to as "closed figure". Even in case of using the ring object 120 of the closed figure other than a circle, the pitch type object 122 about the pitch repertoire of the pitcher object 160 is displayed on the ring object 120, the determination area 124 is displayed in a position that the pitch type object 122 corresponding to the designated pitch type is displayed, and the release object 126 is moved on the ring object 120. However, in FIGS. 7A and 7B, the determination area 124 is omitted.

Figure 7C:
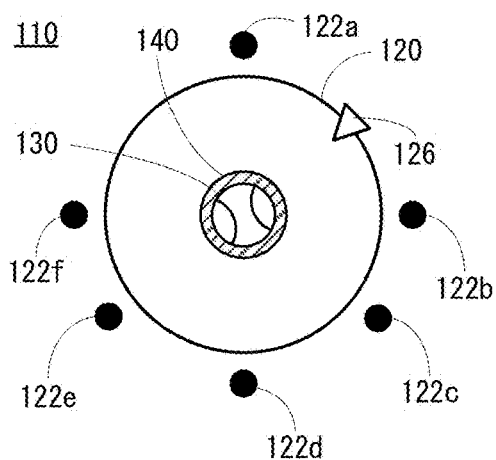
FIG. 7C is an illustration view showing a non-limiting fourth example index object.

Moreover, although the pitch type object 122 is displayed to be superimposed on the ring object 120, it may be displayed with being shifted inside or outside of the ring object 120. Even in such a case, the determination area 124 can be displayed on the ring object 120 at a position that the pitch type object 122 corresponding to the designated pitch type is displayed. A non-limiting example index object 110 is shown in a case where the pitch object 122 (122a-122f) is displayed with being shifted outside of the ring object 120 is shown in FIG. 7C. However, the determination area 124 is omitted in FIG. 7C.

Furthermore, in the above-described index object 110, the ring object 120 is arranged so as to surround the position designation object 130 and the timer object 140, and the pitch type object 122, the determination area (determination object) 124 and the release object 126 are arranged on this ring object 120, but it does not need to be limited to this.

Figure 8A:
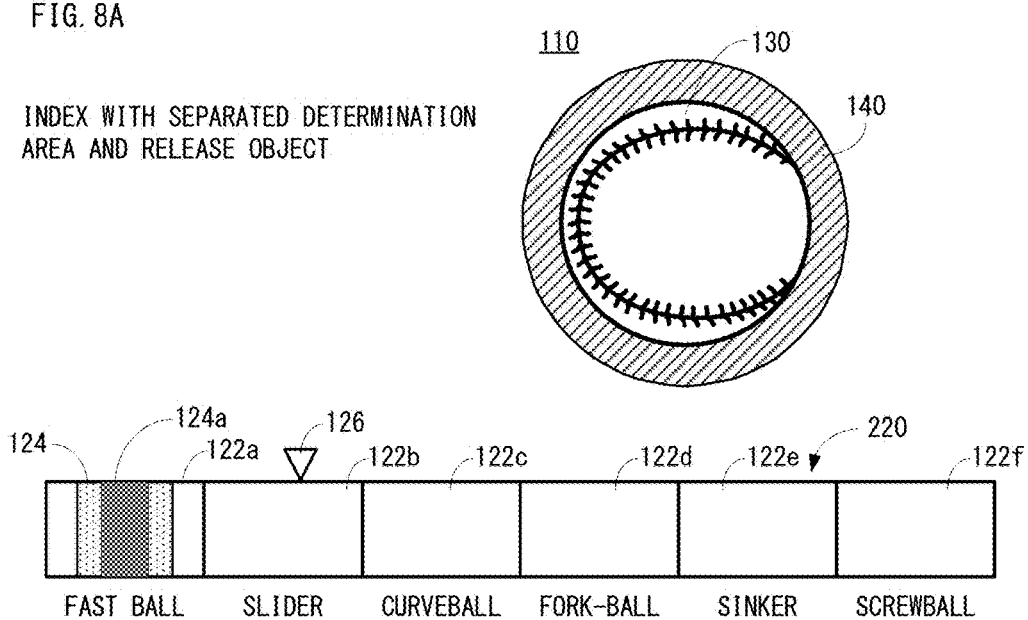
FIG. 8A is an illustration view showing a non-limiting fifth example index object.

For example, as shown in FIG. 8A, the position designation object 130 and the timer object 140 may not be surrounded and the pitch type object 122, the determination area 124 and the release object 126 may be displayed near those objects. In such a case, each of the pitch type objects 122a-122f is represented by a rectangle (quadrangle) for setting the determination area 124. Moreover, these pitch type objects 122a-122f arranged in a strip form (straight line) are collectively called a pitch type designation object 220.

As shown in FIG. 8A, in another non-limiting example index object 110, a horizontally long pitch type designation object 220 is arranged below the position designation object 130 and the timer object 140. However, in FIG. 8A, the index object 110 is illustrated relatively large in order to show it easily, but, as described above, a size of the index object 110 is a size capable of fitting within the effective visual field. For example, in the pitch type designation object 220, the pitch type objects 122a-122f are arranged in this order from the left.

Although illustration is omitted, about the pitch type (pitch repertoire) that the pitcher object 160 can pitch, the pitch type object 122a-122f is displayed in color or high luminance monochrome. On the other hand, about the pitch type that the pitcher object 160 cannot pitch, the pitch type object 122a-122f is displayed in gray-out.

When the player designates a pitch type, the determination area 124 is set (displayed) in the pitch type object 122a-122f corresponding to the designated pitch type. Even in this way, the determination area 124 is displayed on a position near (or adjacent to) the position designation object 130. As described above, the size of the determination area 124 is set in three steps, and in the example shown in FIG. 8A, a fast ball is designated as a pitch type and the determination area 124 of an ordinary size is set. Moreover, in the determination area 124, the partial area 124a for determining whether the pitching is a nice pitching is set. In other words, it is determined whether a timing of a pitching instruction corresponds to a timing that the release object 126 designates the center of the determination area 124 or its vicinity.

Figure 8B:
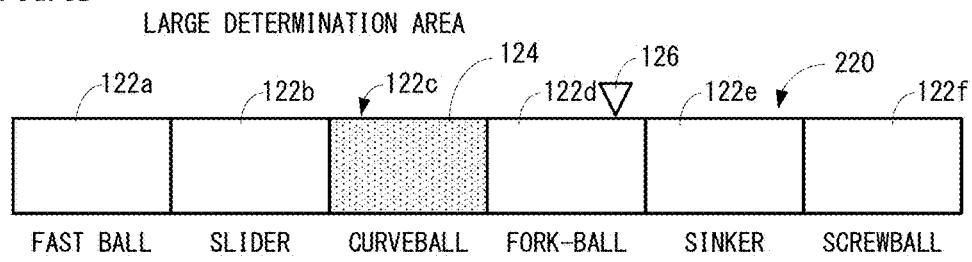
FIG. 8B is an illustration view showing another non-limiting example pitch type designation object that sets the determination area shown in FIG. 8A.
Figure 8C:
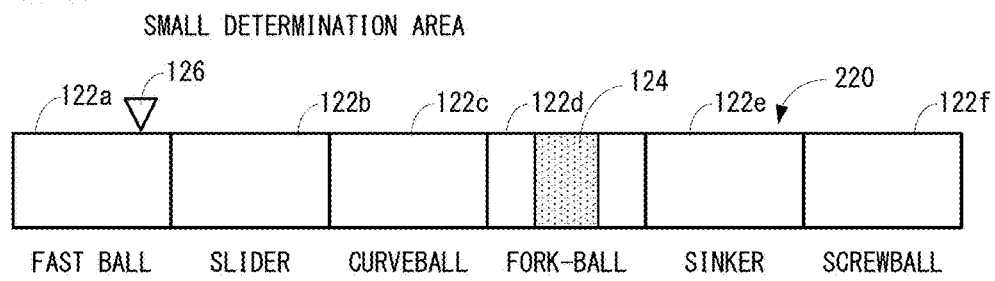
FIG. 8C is an illustration view showing a non-limiting further example pitch type designation object that sets the determination area shown in FIG. 8A.

Moreover, FIG. 8B shows a case where a large determination area 124 is set to the pitch type object 122c corresponding to the designated pitch type. Furthermore, FIG. 8C shows a case where a small determination area 124 is set to the pitch type object 122c corresponding to the designated pitch type. However, in FIGS. 8B and 8C, only the pitch type designation object 220 out of the index objects 110 is shown.

In the examples shown in FIGS. 8A-8C, a large determination area 124 is the same size as each of the pitch type objects 122a-122f, an ordinarily-sized determination area 124 is a width of ⅔ of each of the pitch type objects 122a-122f, and a small determination area 124 is a width of ⅓ of each of the pitch type objects 122a-122f.

A reason why the width of the determination area 124 is thus changed is that a direction that the release object 126 is moved is set in a width direction of the pitch type designation object 220. For example, when starting a defense (at the beginning of the time of switching from an offensive side to a defensive side), the release object 126 starts moving rightward from a left end of the pitch type designation object 220 and moves to a right end. Until the player inputs a pitching instruction or until the time limit expires, the release object 126 starts movement rightward again from the left end when arriving at the right end. This is repeated. However, the release object 126 may reciprocate in a manner that it turns back when arriving at the right end and starts movement leftward from the right end.

In addition, although the release object 126 moves along an upper end of the pitch type designation object 220 (pitch type objects 122a-122f), it may move along a lower end. Alternately, a vertically long release object 126 that extends in a direction perpendicular to a movement direction of the release object 126 may be moved in its longitudinal direction within the pitch type designation object 220. These can be applied to a case shown in FIG. 9B described later similarly.

Although a horizontally long pitch type designation object 220 is arranged below the position designation object 130 and the timer object 140 in the example shown in FIG. 8A, it may be arranged above the position designation object 130 and the timer object 140.

Figure 9A:
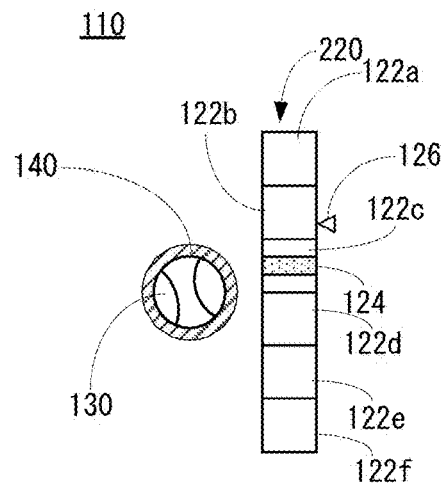
FIG. 9A is an illustration view showing a non-limiting sixth example index object.

Moreover, a vertically long pitch type designation object 220 may be formed, and arranged beside the position designation object 130 and the timer object 140. For example, as shown in FIG. 9A, a vertically long pitch type designation object 220 may be arranged on a right side of the position designation object 130 and the timer object 140. In the pitch type designation object 220 of the example shown in FIG. 9A, vertically long pitch type objects 122a-122f are arranged to be aligned in a downward direction. In this case, the release object 126 moves from an upper end of the pitch type designation object 220 to a lower end thereof. If the release object 126 arrives at the lower end, it starts movement down from the upper end again until the player inputs a pitching instruction or until the time limit expires. This is repeated. However, the release object 126 may reciprocate in a manner that it turns back when arriving at the lower end and starts movement upward from the lower end.

In addition, although the release object 126 moves along a right end of the pitch type designation object 220 (pitch type object 122a-122f), it may move along a left end. Alternately, a horizontally long release object 126 that extends in a direction perpendicular to a movement direction of the release object 126 may be moved in its longitudinal direction within the pitch type designation object 220. These can be applied to a case shown in FIG. 9C described later similarly.

Moreover, the pitch type designation object 220 may be arranged on a left side of the position designation object 130 and the timer object 140. For example, in case of a lefty batter, the pitch type designation object 220 may be arranged on a right side of the position designation object 130 and the timer object 140, and in case of a righty batter, the pitch type designation object 220 may be arranged on a left side of the position designation object 130 and the timer object 140.

Figure 9B:
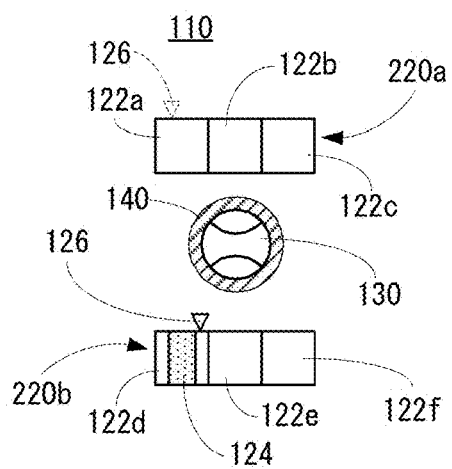
FIG. 9B is an illustration view showing a non-limiting seventh example index object.
Figure 9C:
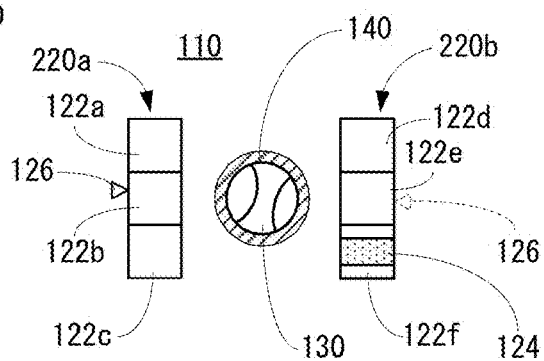
FIG. 9C is an illustration view showing a non-limiting eighth example index object.

Furthermore, in further non-limiting example index object 110, the pitch type designation object is divided into two pitch type designation objects 220a and 220b, and as shown in FIG. 9B, the pitch type designation object 220a and the pitch type designation object 220b may be arranged above and bottom so as to sandwiching the position designation object 130 and the timer object 140, or as shown in FIG. 9C, the pitch type designation object 220a and the pitch type designation object 220b may be arranged left and right so as to sandwiching the position designation object 130 and the timer object 140

In either case of FIGS. 9B and 9C, a point that the determination area 124 is set into one of the pitch type objects 122a-122f corresponding to the designated pitch type is the same as a case of the above-described index object 110. A size of the determination area 124 is three kinds, and is the same as those of cases shown in FIGS. 8A-8C.

When the pitch type designation object 220a and the pitch type designation object 220b are arranged above and bottom so as to sandwich the position designation object 130 and the timer object 140 as shown in FIG. 9B, the release object 126 starts movement rightward from the left end of the pitch type designation object 220a, and moves to a right end. Subsequently, the release object 126 starts movement rightward from the left end of the pitch type designation object 220b, and moves to the right end. If the release object 126 arrives at the right end of the pitch type designation object 220b, it starts movement rightward from the left end of the pitch type designation object 220a again until the player inputs a pitching instruction or until the time limit expires. This is repeated. However, the release object 126 may reciprocate in a manner that it turns back when arriving at the right end of the pitch type designation object 220b and starts movement leftward, further if arriving at the left end of the pitch type designation object 220b and starts movement leftward from the right end of the pitch type designation object 220a, and turns back when arriving at the left end of the pitch type designation object 220a and starts movement rightward from the left end.

FIG. 9C is the same as a case shown in FIG. 9B except that a direction that the release object 126 moves is a vertical direction.

However, in FIG. 9B and FIG. 9C, the release object 126 may be moved along with the pitch type designation object 220a or 220b including the determination area 124 that is set corresponding to the designated pitch type.

In addition, there is no necessity for the timer object 140 to be arranged around the position designation object 130, and for example, the timer object 140 may be constituted in a ring shape that is larger than the ring object 120 and arranged so as not to be overlapped with the determination area 124.

Moreover, the timer object 140 may be formed in a shape of stick (strip) and arranged so as to be in parallel with the pitch type designation object 220.

Figure 10:
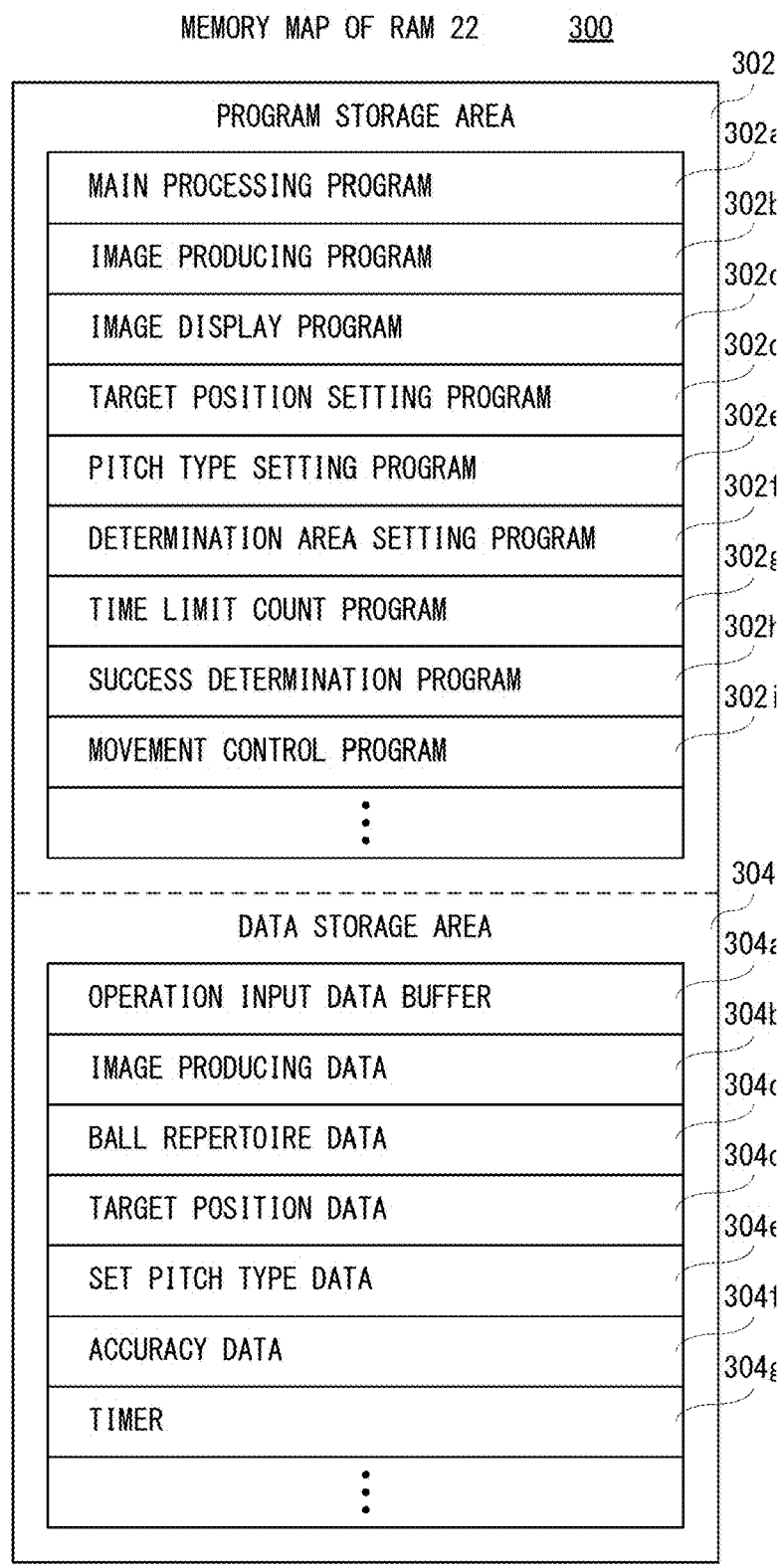
FIG. 10 is an illustration view showing a non-limiting example memory map of a RAM incorporated in the game apparatus shown in FIG. 1.

FIG. 10 is an illustration view showing a no-limiting example memory map 300 of the RAM 22 of the game apparatus 10 shown in FIG. 1. As shown in FIG. 10, the RAM 22 includes a program storage area 302 and a data storage area 304. The program storage area 302 is stored with an information processing program such as an application program of the game in this embodiment, and the information processing program includes a main processing program 302a, an image producing program 302b, an image display program 302c, a target position setting program 302d, a pitch type setting program 302e, a determination area setting program 302f, a time limit count program 302g, a success determination program 302h, movement control program 302i, etc.

The main processing program 302a is a program for processing a main routine of game processing of the baseball game of this embodiment. The image producing program 302b is a program for producing data (game image data) of a game image (game screen 100 etc.) with using image producing data 304b. The image display program 302c is a program for outputting the game image data that is produced according to the image producing program 302b to the display 36. Therefore, a game image corresponding to game image data is displayed on the display 36.

The target position setting program 302d is a program for setting a position that is designated by the player as a target position that the ball object 162 (moving object) is made to be arrived at. As described above, when the index object 110 is moved and stopped according to an operation of the player, the target position setting program 302d sets a position that is designated by the position designation object 130 as a target position of the ball object 162. However, designation of a target position of the ball object 162 can be changed until a pitching instruction is input.

The pitch type setting program 302e is a program for setting a pitch type that is designated by the player as a pitch type of the ball object 162 that is to be pitched. That is, one pitch type is set out of the pitch types capable of being pitched by the pitcher object 160. However, the pitch types capable of being pitched by the pitcher object 160 can be known with reference to pitch repertoire data 304c. Moreover, designation of a pitch type of the ball object 162 can be changed until a pitching instruction is input.

The determination area setting program 302f is a program for deciding that the determination area 124 is to be displayed at a position on the ring object 120 corresponding to a pitch type that is set according to the pitch type setting program 302e, and setting a size of the determination area 124 according to whether the pitch type is good, poor or ordinary. Image data of the determination area 124 is produced according to the image producing program 302b, and included in the game image data. It should be noted that the set pitch type can be known with reference to the set pitch type data 304e. Moreover, information on whether the set pitch type is good, poor or ordinary for the pitcher object 160 can be known by referring to the repertoire pitch data 304c described later.

The time limit count program 302g is a program for counting the time limit, and controls the timer 304g. If the pitcher object 160 is enabled to pitch the ball object 162, the timer 304g starts a count of the time limit, and notifies a count value to the CPU 20 in response to an inquiry from the CPU 20. Moreover, the image data of the timer object 140 is produced and changed (updated) according to the count value of the timer 304g.

The success determination program 302h is a program for determining success or failure of pitching (pitching instruction), and whether a position that the release object 126 is stopped is within the determination area 124. Moreover, when a pitch type is a fast ball, the CPU 20 determines, according to the success determination program 302h, whether a position that the release object 126 is stopped is within the partial area 124a. That is, it is determined whether it is a nice pitching.

The movement control program 302i is a program for making the ball object 162 that is pitched by the pitcher object 160 move based on a determination result by the success determination program 302h.

As described above, the first speed for a fast ball and the second speed for a breaking ball are set in advance for each pitcher object 160, and the trajectory is also set in advance for each pitch type. If the pitching (pitching instruction) is successful, the ball object 162 is moved in the designated course on the trajectory according to the set pitch type with the speed according to the pitch type (the first speed or the second speed). However, when the pitch type is a fast ball and a nice pitching is determined, the ball object 162 is moved at a speed faster than the first speed. Moreover, a trajectory according to a pitch type is acquired with reference to the repertoire pitch data 304c.

If a pitching (pitching instruction) is failure, a manner of movement of the ball object 162 differs according to the deviation amount. If the deviation amount is less than a predetermined threshold value, according to the deviation amount, an arrival position of the ball object 162 is moved to left or right from the target position. Moreover, even if the set pitch type is a breaking ball, the ball object 162 is moved with the ball speed (the second speed) and the trajectory of a fast ball. If the deviation amount is equal to or more than the predetermined threshold value, the ball object 162 moves so as to pitch a wild pitch or moves at the middle center with the ball speed (the second speed) and the trajectory of a fast ball.

Although illustration is omitted, the program storage area 302 is further stored with other programs, such as a communication program for performing communication with other game apparatuses 10, a program for saving (storing) game data (save data) to the flash memory 24, a sound output program for producing and outputting a sound required for a game, etc.

An operation input data buffer 304a is provided in the data storage area 304. The data storage area 304 is stored with data such as the image producing data 304b, pitch repertoire data 304c, target position data 304d, set pitch type data 304e, accuracy data 304f, etc. Furthermore, a timer 304g is provided in the data storage area 304.

The operation input data buffer 304a is an area for temporarily storing operation data from the input device 30. The operation data is stored in the operation input data buffer 304a in a time series fashion when received by the CPU 20, and erased if used for processing of the CPU 20.

The image producing data 304b includes data for producing game image data, such as polygon data, texture data, object image data, etc. However, the object image data is image data about various kinds of objects or characters (102, 104, 106, 110, 120, 122, 124, 126, 150, 160, 162, etc.) arranged or entering (appearing) in a virtual space.

The pitch repertoire data 304c is data about a pitch type capable of being pitched by a pitcher object 160 that is selected to be used, and information indicative of good, poor or ordinary for the pitcher object is added to each of the pitch types. Moreover, the pitch repertoire data 304c also includes data of the trajectory for each pitch. Furthermore, the pitch repertoire data 304c also includes the information (data) indicating whether the pitcher object 160 being selected to be used is a righty pitcher or lefty pitcher. Therefore, the pitch repertoire data 304c can also be referred to as data about the pitcher object 160. Accordingly, if the pitcher object 160 is switched, the pitch repertoire data 304c is changed to the pitch repertoire data 304c corresponding to the pitcher object 160 after switching.

The target position data 304d is position data about a target position that is set according to the target position setting program 302*d*, and is data about a position (three-dimensional coordinate) instructed by the position designation object 130 included in the index object 110 that is designated according to an operation of the player.

The set pitch type data 304*e* is data about the pitch type that is set according to the pitch type setting program 302*e*. The accuracy data 304*f* is data about a determination result of the success determination program 302*h*. When it is determined that the pitching is successful, the accuracy data 304*f* is data indicating that the pitching is successful, and if a pitch type is a fast ball, data on whether it is a nice pitching is further included. On the other hand, when it is determined that the pitching is failure, the accuracy data 304*f* includes data indicating that the pitching is failure and data of a deviation amount of the position of the release object 126 with respect to the position of the determination area 124.

The timer 304*g* is a counter for counting the time limit (for example, 10 seconds), and starts a count according to an instruction by the CPU 20. However, when starting a count, the timer 304*g* is reset.

Although illustration is omitted, the data storage area 304 is stored with other data, and is provided with a flag(s) and other counter(s) (timer(s)) required for game processing (information processing).

Figure 11:
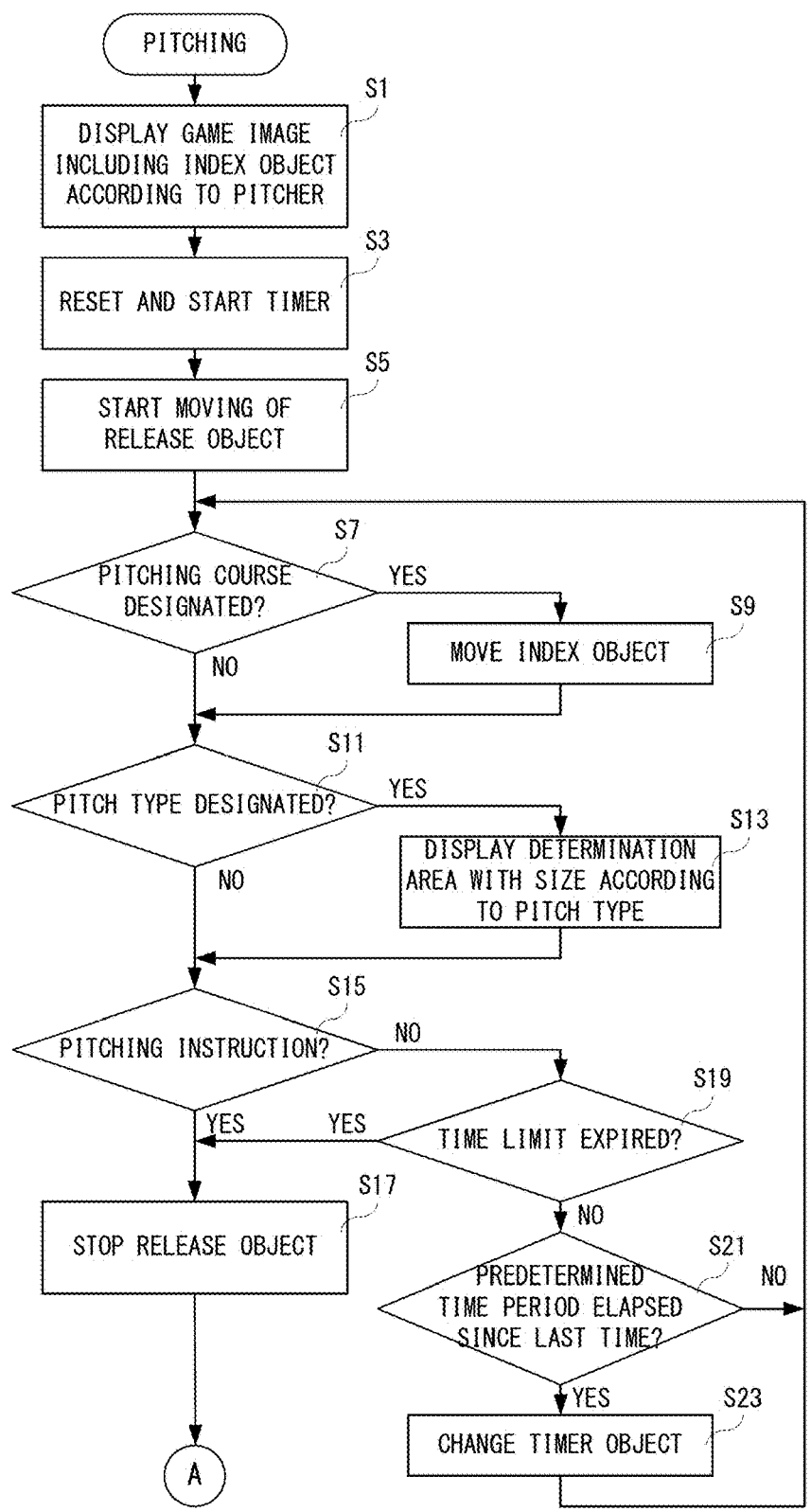
FIG. 11 is a flow chart showing a part of a non-limiting example pitching processing of a CPU incorporated in the game apparatus shown in FIG. 1.
Figure 12:
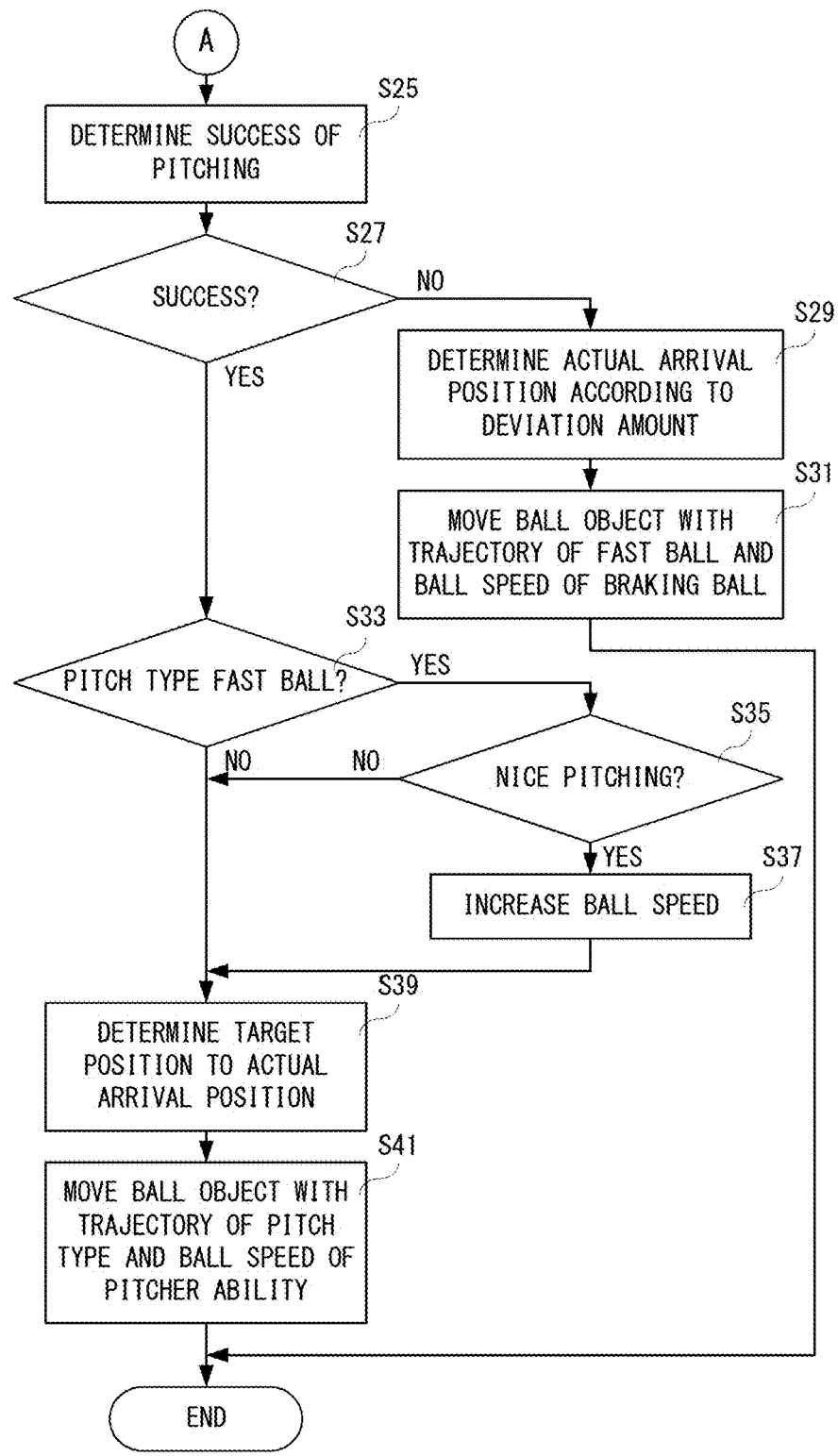
FIG. 12 is a flow chart showing another part of the non-limiting example pitching processing of the CPU incorporated in the game apparatus shown in FIG. 1, following FIG. 11.

FIG. 11 and FIG. 12 are flow charts of a non-limiting pitching processing of the CPU 20 shown in FIG. 1. For example, this pitching processing is started when becoming a state where the batter object 102 is standing in the batter box and the pitcher object 160 is having the ball object 162. As shown in FIG. 11, if the pitching processing is started, the CPU 20 displays, in a step S1, a game image including the index object 110 according to the pitcher object 160. Here, the CPU 20 controls the display driver 32 to display a game screen 100 as shown in FIG. 2 on the display 36.

At this time, with reference to the pitch repertoire data 304*c*, information of the righty pitcher or lefty pitcher, a pitch type capable of being pitched and information of good, poor or ordinary for each pitch type. Therefore, a pitch type object 122 to be displayed on the ring object 120 that is included in the index object 110 is decided, and a size of the determination area 124 for each pitch type is decided.

Moreover, as described above, at the time of starting pitching, in the index object 110, the determination area 124 is displayed in a position overlapping with the pitch type object 122*a*, and the release object 126 is displayed in front of the determination area 124 in a position overlapping with the pitch type object 122*a*.

However, when the pitching to the current batter object 102 is after a second ball, in the index object 110, the determination area 124 is displayed in a position overlapping with the pitch type object 122 corresponding to the pitch type that is pitched at the last time, and the release object 126 is displayed on a stop position at the last time.

The timer 304*g* is reset and started in a subsequent step S3, and a movement of the release object 126 is started from the current position in a step S5. However, a direction that the release object 126 moves is decided according to whether the pitcher object 160 is a righty pitcher or a lefty pitcher. Then, it is determined whether there is any designation of a pitching course in a step S7. Here, it is determined whether there is any moving instruction of the index object 110.

If "YES" is determined in the step S7, that is, if there is the designation of a pitching course, in a step S9, the index object 110 is moved according to an operation of the player, and the process proceeds to a step S11. However, the CPU 20 stores (updates) the target position data 304*d* in the step S9. That is, a target position is set. On the other hand, if "NO" is determined in the step S7, that is, if it is not designation of a pitching course, it is determined whether there is designation of a pitch type in a step S11.

If "YES" is determined in the step S11, that is, if there is the designation of a pitch type, in a step S13, on the index object 110, the determination area 124 is displayed (moved) in front of the pitch type object 122 corresponding to the designated pitch type area 124, and the process proceeds to a step S15. However, in the step S13, the CPU 20 stores (updates) the set pitch type data 304*e*. That is, a pitch type of the ball object 162 is set. Moreover, a size of the determination area 124 is decided based on the information of good, poor or ordinary for the designated pitch type, as described above. On the other hand, if "NO" is determined in the step S11, that is, if there is no designation of a pitch type, it is determined whether there is any pitching instruction in a S15. Here, the CPU 20 determines whether an instruction to stop a movement of the release object 126 is input.

If "YES" is determined in the step S15, that is, if there is a pitching instruction, the release object 126 is stopped in a step S17, and the process proceeds to a step S25 shown in FIG. 12. On the other hand, if "NO" is determined in the step S15, that is, if there is no pitching instruction, it is determined whether the time limit expires in a step S19. Here, the CPU 20 determines whether a count value of the timer 304*g* exceeds the time limit. However, when the count value is coincident with the time limit, it may be determined that the count value exceeds the time limit.

If "YES" is determined in the step S19, that is, if the count value exceeds the time limit, the process proceeds to the step S17 in which the release object 126 is stopped automatically. On the other hand, if "NO" is determined in the step S19, that is, if the time limit expires, it is determined whether a predetermined time period (one (1) second, for example) elapses since the display of the timer object 140 is changed at the last time in a step S21. If "NO" is determined in the step S21, that is, if the predetermined time period does not elapse after the display of the timer object 140 is changed at the last time, the process returns to the step S7. On the other hand, if "YES" is determined in the step S21, that is, if the predetermined time period elapses after the display of the timer object 140 is changed at the last time, the process returns to the step S7 after changing the timer object 140 in a step S23. In the step S23, a length of the timer object 140 is shortened by a length equivalent to the predetermined time period. However, when shortening the length of the timer object 140 first, a position corresponding at 0:00 of a clock is set as a start position.

As shown in FIG. 12, success or failure of the pitching is determined in the step S25. Here, the CPU 20 determines whether the release object 126 overlaps with the determination area 124 to determine success or failure of the pitching (pitching instruction). However, when the partial area 124*a* is set to the determination area 124, the CPU 20 also determines whether the release object 126 overlaps with the partial area 124*a*. Moreover, when the release object 126 is not overlapped with the determination area 124, the CPU 20 calculates a deviation amount of the release object 126 with respect to the determination area 124.

In a subsequent step S27, it is determined whether a determination result in the step S25 is success. If "NO" is determined in the step S27, that is, if the determination result in the step S25 is failure, an actual arrival position of the ball object 162 is set according to the deviation amount in a step S29. If the deviation amount is less than a threshold value, according to the deviation amount, the actual arrival position is moved (decided) to left or right from the target position. On the other hand, if the deviation amount is equal to or more than the threshold value, the arrival position is moved (decided) to a position resulting in a wild pitch or a position of the middest center.

Subsequently, in a step S31, the ball object 162 is moved to the actual arrival position with a trajectory of a fast ball and the ball speed of a breaking ball (second speed), and then, the pitching processing is ended. However, the pitching processing is repeatedly performed when becoming a state where the pitcher object 160 is able to pitch until the defensive side is switched to the offensive side.

Moreover, if "YES" is determined in the step S27, that is, if the determination result in the step S25 is success, it is determined whether the pitch type indicated by the set pitch type data 304e is a fast ball in a step S33. If "YES" is determined in the step S33, that is, if the pitch type is a fast ball, it is determined whether it is a nice pitching in a step S35.

If "NO" is determined in the step S35, that is, if it is not a nice pitching, the process proceeds to a step S39. On the other hand, if "YES" is determined in the step S35, that is, if it is a nice pitching, the process proceeds to the step S39 after adding the ball speed in a step S37.

In the step S39, the target position is set to the actual arrival position, and in a step S41, the ball object 162 is moved on the trajectory according to the pitch type with the ball speed according to the ability of the pitcher object 160 (the first speed or the second speed), and then, the pitching processing is terminated. However, when adding the ball speed in the step S37, the speed (first speed) according to the ability of the pitcher object 160 is updated to a ball speed added with the predetermined speed.

According to this embodiment, since the target position and the trajectory of a moving object such as the ball object can be designated using the index object regardless of an order of designation, the operability by the player can be improved.

Moreover, according to this embodiment, since the index object being arranged with the pitch type object that designates a pitch type around the designation object that designates the target position is used, it is possible to perform at least one of the designation of the pitching course and the designation of the pitch type while visually confirming both the pitching course and the pitch type.

Furthermore, according to this embodiment, since the index object that is arranged with the release object that is for instructing a pitching timing is used and the determination area around the designation object that designates the target position, it is possible to perform at least one of the designation of the pitching course and the designation of the pitch type while visually confirming both the pitching course and the pitch type.

Furthermore, according to this embodiment, since the index object that is arranged with the pitch type object, the release object and the determination area around the designation object, it is possible to perform at least one of the designation of the pitching course, the designation of the pitch type and the pitching instruction while visually confirming the pitching course, the pitch type and the pitching timing.

Therefore, according to this embodiment, it is possible to improve the operability by the player.

Moreover, according to this embodiment, since it is possible to know the pitch type with a graphical user interface (GUI) such as the index object, there is no necessity of memorizing the pitch type capable of being pitched for each pitcher, and it is also unnecessary to investigate the pitch type capable of being pitched for each pitcher.

Furthermore, according to this embodiment, since the position of the determination area for determining the success or failure of pitching differs for each pitch type, it is possible to prevent a pitching operation from becoming monotonous.

Furthermore, although the partial area 124a for determining a nice pitching is provided in the determination area 124 so as to determine whether it is a nice pitching when the pitch type is a fast ball in this embodiment, such a partial area 124a may be provided even in case of a breaking ball. In such a case, if it is determined that the pitching is success and it is further determined that it is a nice pitching, the second speed is increased by the predetermined speed. However, when a pitch type is a breaking ball, a breaking amount of the ball object 162 may be large replacing with increasing the second speed with the predetermined speed or together with increasing the second speed with the predetermined speed. In such a case, although the pitching is success, the actual arrival position of the ball object 162 is deviated from the target position. That is, even in the determination area 124, a difference between the target position and the actual arrival position is set according to the deviation amount of the partial area 124a and the release object 126.

In addition, although a case where the pitcher object 160 pitches (releases) the ball object 162 in the baseball game is described in this embodiment, a kind of game does not need to be limited. As other examples, the present invention can be applied to a bowling game, a soccer game, a golf game or a tennis game.

In the following, although described briefly, in a bowling game, throwing (pitching) a ball like the above-described baseball game means releasing a ball object. Moreover, in a soccer game, kicking a ball means releasing a ball object. Furthermore, in a golf game and a tennis game, hitting a ball means releasing a ball object.

Figure 13:
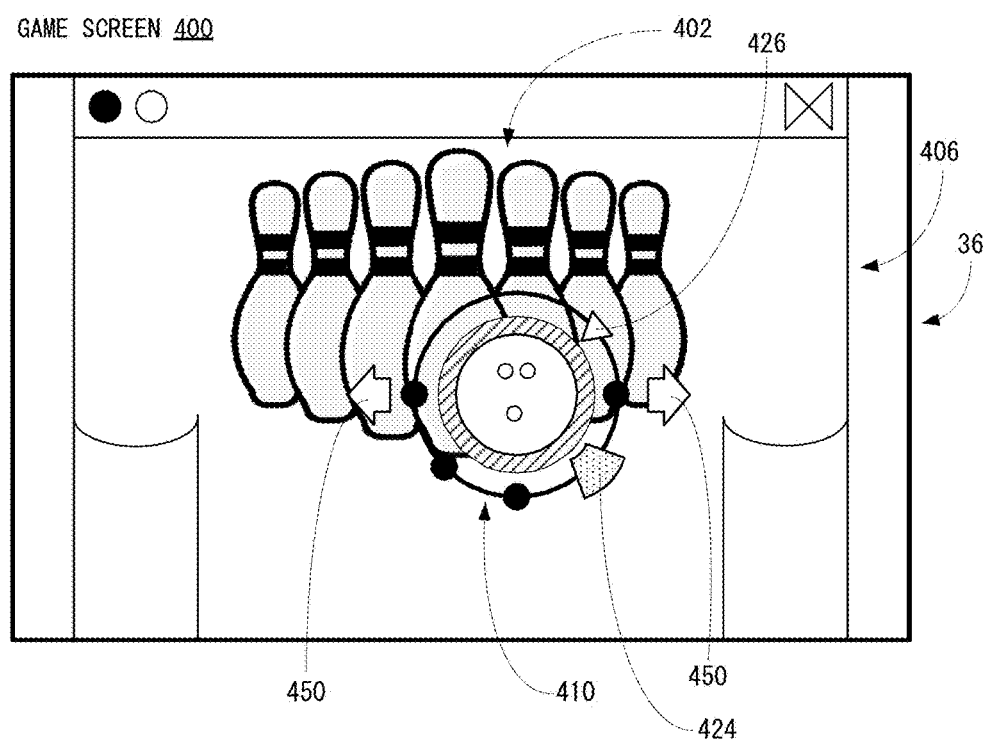
FIG. 13 is an illustration view showing a non-limiting example game screen of a bowling game displayed on the display of the game apparatus shown in FIG. 1.

For example, in case of bowling game, before throwing, a game screen 400 as shown in FIG. 13 is displayed. Although the game screen 400 etc. will be described in the following, a description is made with using the same name for the same objects as the objects described in the baseball game.

In the game screen 400, a plurality of pin objects 402 each imitating a bowling pin are displayed, and a background object 406 such as an object of a lane that the pin objects 402 are located thereon (lane object) is displayed. Moreover, an index object 410 is displayed in the game screen 400 in front of the pin objects 402. Furthermore, an operation guide 450 is displayed on the right and left of the index object 410.

Figures 14A, 14B:
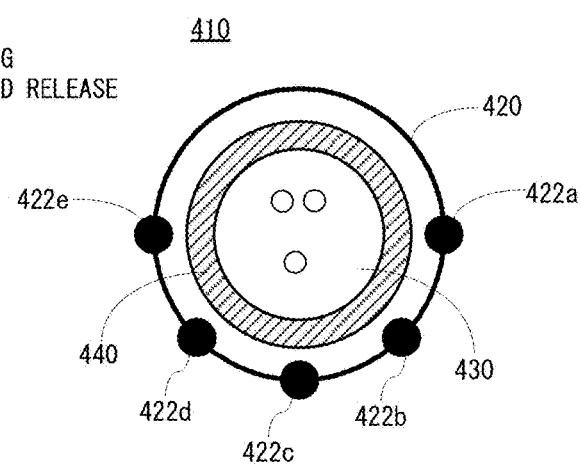
FIG. 14A is an illustration view showing a non-limiting example index object (omitting a determination area and a timing object) displayed in the game screen shown in FIG. 13.
FIG. 14B is an illustration view showing a non-limiting example pitch type capable of being designated in the index object shown in FIG. 14A.

As well shown in FIG. 14A, in the bowling game, instead of the ball of the baseball game, an image imitating a bowling ball is displayed, in the index object 410. A plurality of pitch type objects 422 are displayed on a ring object 420. In this embodiment, pitch type objects 422a, 422b, 422c, 422d and 422e are displayed. As shown in FIG. 14B, in case of a righty, the pitch type object 422a indicates a large backup ball, the pitch type object 422b indicates a small backup ball, the pitch type object 422c indicates a straight ball, the pitch type object 422d indicates a small hook ball, and the pitch type object 422e indicates a large hook ball. On the other hand, in case of a lefty, left-right reversed with a case of the righty, the pitch type object 422a indicates a large hook ball, the pitch type object 422b indicates a small hook ball, the pitch type object 422c indicates a straight ball, the pitch type object 422*d* indicates a small backup ball, and the pitch type object 422*e* indicates a large backup ball.

However, here, "large" means that the ball is curved largely (curve amount is large), and "small" means that the ball is curved small (curve amount is small).

In this bowling game, before throwing, at least one of designation of a throwing course and designation of a throwing type (corresponding to the pitch type in the above described embodiments) is performed. A point that the player performs an operation so as to input a pitching instruction at a position that a release object 426 that is moved along the ring object 420 overlaps with the determination area 424 is the same as a case of the baseball game.

When throwing is successful, a ball object rolls on the designated pitching course on a trajectory according to the designated throwing type, but when the throwing is failure, an actual arrival position of the ball object is deviated according to a deviation amount of the release object 426 and the determination area 424 with a trajectory of straight irrespective of the designated throwing type, or the ball object falls to a gutter.

In addition, also in case of the bowling game, a movement speed of the ball object may be set according to the throwing type so as to control a ball speed like a case of the baseball game.

Moreover, although illustration is omitted, in a soccer game, at the time of a free kick or PK, an index object as shown in the embodiment is displayed in front of objects of a goalpost and a keeper, and it is possible to perform an operation for performing a shoot (pass) with using this index object. For example, kicked ball types (corresponding to the pitch types in the above described embodiments) are a large curve, a small curve, a large shooter, a small shooter, a straight, no-spin, a drive, etc., and the kicked ball type object is displayed on a ring object so that these kicked ball types can be designated.

In this soccer game, a method of determining success or failure of the shoot (pass) and a movement of the ball object according to a determination result are the same as in the above-described embodiment. For example, if the shoot (pass) is successful, the ball object moves with the designated kicked ball type toward the designated position. On the other hand, if the shoot (pass) is failure, the ball object moves to the arrival position deviated from the designated target position with the straight regardless of the designated kicked ball type, or the ball object moves to a position deviated from the goal post or pass partner at all.

In addition, also in case of the soccer game, a movement speed of the ball object may be set according to the kicked ball type so as to control a ball speed like a case of the baseball game.

Furthermore, although illustration is omitted, in a golf game, it is possible to perform an operation hitting a golf ball by using an index object shown in the embodiment while displaying the index object at an arrival point based on a flight distance according to a golf club. For example, hit-ball types (corresponding to the pitch types in the above described embodiments) are a draw, a hook, a slice, a fade, a straight, etc., and a pitch type object 122 is displayed on a ring object so that these hit-ball types can be designated.

In this golf game, a method of determining success or failure of the shot and a movement of the ball object according to a determination result are the same as in the above-described embodiment. For example, when the shot is successful, a ball object moves to the designated position with the designated hit-ball type. On the other hand, when the shot is failure, irrespective of the designated hit-ball type, for example, it becomes a miss shot (dribbled shot, skied shot, shank, duffed shot, etc.), a ball object is moved according to the content of the miss shot, and in some cases, the ball object is moved to a hazard or OB (out-of-bounds).

In addition, also in case of the golf game, a movement speed of the ball object may be set according to the hit-ball type so as to control a ball speed like a case of the baseball game.

Furthermore, although illustration is omitted, in a tennis game, it is possible to perform an operation hitting a ball object by using an index object shown in the embodiment while displaying the index object in front of an opponent player at the time of hitting (serve or rally). For example, hit-ball types (corresponding to the pitch types in the above described embodiments) are a topspin ball, a flat ball, a slice ball, a lobbing ball, a drop shot, etc., and a pitch type object is displayed on a ring object so that these hit-ball types can be designated.

In this tennis game, a method of determining success or failure of the shot and a movement of the ball object according to a determination result are the same as in the above-described embodiment. For example, when the hitting is successful, a ball object moves to the designated position with the designated hit-ball type. On the other hand, when the hitting is failure, irrespective of the designated hit-ball type, a ball object is moved according to an arrival position deviated from the designated target with the trajectory of the straight, or to a position off a tennis court.

In addition, also in case of the tennis game, a movement speed of the ball object may be set according to the hit-ball type so as to control a ball speed like a case of the baseball game.

Moreover, a moving object does not need to be limited to a ball object. For example, when throwing an object (disk object) imitating a flying disk, an index object can be used similarly. In this case, replacing with a pitch type, a trajectory that the flying disk flies is to be designated. For example, one trajectory is designated out of a plurality of trajectories having different curving directions and curving magnitudes and a straight trajectory.

In this game using the disk object, a method of determining success or failure of the throwing and a movement of the disk object according to a determination result are the same as in the above-described embodiment. For example, when the throwing succeeds, the disk object moves (flies) to the designated position with the designated trajectory. On the other hand, when the throwing fails, irrespective of the designated trajectory, the disk object is moved to an arrival position deviated from the designated target position with the trajectory of a straight or to a position being different at all or the disk object is fallen immediately.

In addition, also in case of the game using the disk object, a moving speed of the disk object may be set according to the trajectory so as to control the moving speed like a case of the baseball game.

Moreover, in the game using the disk object, throwing or pitching the disk object means releasing the object.

Figure 15A:
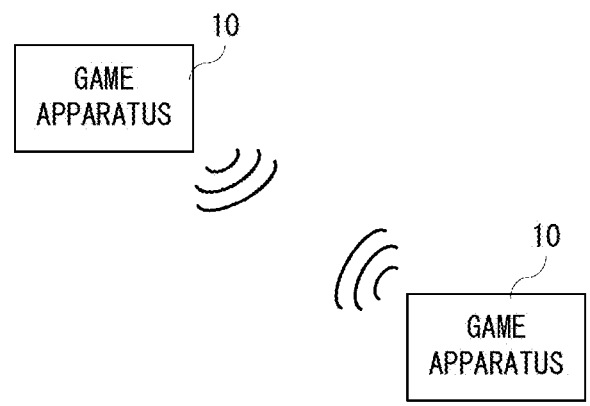
FIG. 15A is an illustration view showing a non-limiting example communication game system.
Figure 15B:
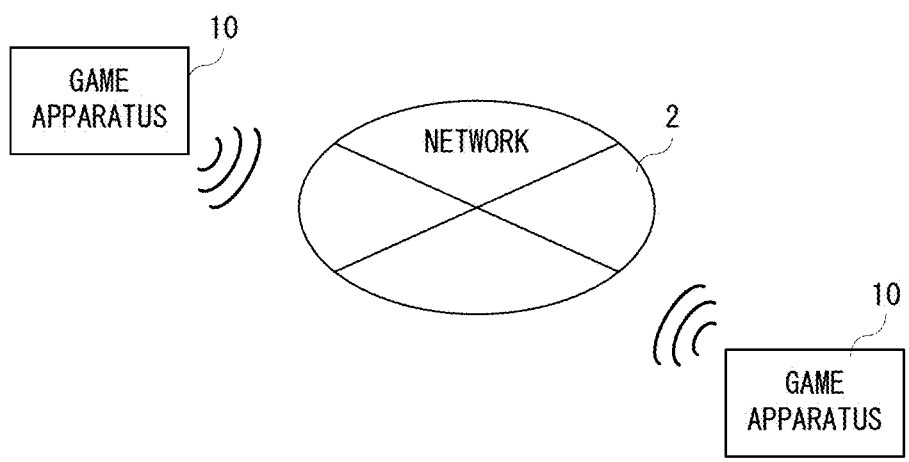
FIG. 15B is an illustration view showing another non-limiting example communication game system.

Moreover, although the above-described embodiments, a case where the baseball game is played by a single game apparatus 10 is shown, it does not need to be limited to this. Two game apparatuses 10 may make a communication battle of a baseball game. In this case, as shown in FIG. 15A, the game system 1 that the two game apparatuses 10 communicate with each other directly is constituted. Otherwise, as shown in FIG. 15B, the game system 1 that the two game apparatuses 10 communicate with each other through a network 2 such Internet or a LAN. However, as long as the two game apparatuses can communicate with each other to play communication battle, types of the two game apparatuses constituting the game system 1 need not be the same.

In addition, although a case of using a portable game apparatus or portable terminal is described in this embodiment, it is needless to say that it is possible to use other apparatus such as a stationary game apparatus, a desktop PC and an arcade game apparatus. However, when performing a battle play with other apparatus such as a stationary game apparatus, a desktop PC and an arcade game apparatus, it should be configured to communicate with other apparatuses to play in a situation that the pitching content of the opponent cannot be seen. Moreover, other portable terminals such as a notebook PC, PDA, a tablet PC, etc. can be used.

Moreover, specific contents of game, configuration of the game apparatus and numerical values shown in this embodiment are mere examples, should not be limited, and can be appropriately changed according to actual products.

Furthermore, when the same effect (result) is acquired, an order of the steps shown in the flowcharts may be changed suitably.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing apparatus that releases an object in a virtual space based on an instruction of a player and makes the object move based on a trajectory of a type designated by the player, comprising:

memory for storing instructions and at least one processor for executing the instructions such that the information processing apparatus is configured to at least perform:

a setting to set, within a predetermined time period before the object is released, a reference position that is used for determining an arrival position of the object and a trajectory type of the object in a designated order even if the player designates the reference position and the trajectory type in any order; and a movement processing to perform movement processing of the object based on the reference position and the trajectory type that are set in the setting, a first processing to display together a first index that is variable according to a designated content of the reference position by the player and a second index that is variable according to a designated content of the trajectory type by the player, wherein the first processing displays the second index with a changing position thereof on a route surrounding the first index according to the designation content of the trajectory type by the player.

2. The information processing apparatus according to the claim 1, wherein the setting sets again, within the predetermined time period before the object is released, the reference position and the trajectory type according to a changing order even if the player changes designation in any order.

3. The information processing apparatus according to the claim 1, wherein the first processing moves the second index in conjunction with a movement of the first index according to the designation content of the reference position by the player.

4. The information processing apparatus according to the claim 1, wherein the information processing apparatus is further configured to perform a second processing to display a third index for setting a difference between the reference position and an actual arrival position of the object.

5. The information processing apparatus according to the claim 4, wherein the second processing displays the third index that is at least a part thereof is common to the second index.

6. The information processing apparatus according to the claim 4, wherein the second processing displays the third index including a timing object that moves along a predetermined route and a determination object that is arranged on the route, and the setting sets a difference based on a positional relationship between the timing object and the determination object, the positional relationship being specified by the player.

7. The information processing apparatus according to the claim 6, wherein the predetermined route surrounds the first index.

8. The information processing apparatus according to the claim 6, wherein the determination object constituting the third index is at least partly in common to the second index.

9. The information processing apparatus according to the claim 1, wherein the information processing apparatus is further configured to display a timer index that enable the player to recognize an amount of time that the player can perform designation.

10. The information processing apparatus according to the claim 9, wherein the information processing apparatus is further configured to display the timer index in a position surrounding the first index.

11. The information processing apparatus according to the claim 1, wherein the information processing apparatus is further configured to display another index that enable the player to recognize the trajectory type capable of being designated by the player.

12. The information processing apparatus according to the claim 1, wherein the second index, which is variable according to the designated content of the trajectory type by the player, is displayed with the changing position thereof before the release of the object.

13. A non-transitory computer readable storage medium storing a game program that is executed by one or more processors of an information processing apparatus that performs control of an object that is released in a virtual space based on an instruction of a player and moved based on a trajectory of a type designated by the player, wherein the game program causes the one or more processors to perform:

setting, within a predetermined time period before the object is released, a reference position that is used for determining an arrival position of the object and a trajectory type of the object in a designated order even if the player designates the reference position and the trajectory type in any order;

performing movement processing of the object based on the reference position and the trajectory type that are set in the setting; and performing a first processing to display together a first index that is variable according to a designated content of the reference position by the player and a second index that is variable according to a designated content of the trajectory type by the player, wherein the first processing displays the second index with a changing position thereof on a route surrounding the first index according to the designation content of the trajectory type by the player.

14. The non-transitory computer readable storage medium according to the claim 13, wherein the second index, which is variable according to the designated content of the trajectory type by the player, is displayed with the changing position thereof before the release of the object.

15. A game control method of an information processing apparatus that performs control of an object that is released in a virtual space based on an instruction of a player and moved based on a trajectory of a type designated by the player, comprising steps of:
   (a) setting, within a predetermined time period before the object is released, a reference position that is used for determining an arrival position of the object and a trajectory type of the object in a designated order even if the player designates the reference position and the trajectory type in any order;
   (b) performing movement processing of the object based on the reference position and the trajectory type that are set in the step (a); and
   (c) performing a first processing to display, within a predetermined time period, together a first index that is variable according to a designated content of the reference position by the player and a second index that is variable according to a designated content of the trajectory type by the player, wherein the first processing displays the second index with a changing position thereof on a route surrounding the first index according to the designation content of the trajectory type by the player.

16. The game control method according to the claim 15, wherein the second index, which is variable according to the designated content of the trajectory type by the player, is displayed with the changing position thereof before the release of the object.

* * * * *